United States Patent [19]

Santo

[11] Patent Number: 5,215,329

[45] Date of Patent: Jun. 1, 1993

[54] TWIST BEAM TYPE REAR SUSPENSION REINFORCED AGAINST SIDE FORCE WITH LONGITUDINAL COMPLIANCE

[75] Inventor: Toshiyasu Santo, Susono, Japan

[73] Assignee: Toyota Jidosha Kabushiki Kaisha, Aichi, Japan

[21] Appl. No.: 780,107

[22] Filed: Oct. 21, 1991

[30] Foreign Application Priority Data

Nov. 22, 1990 [JP] Japan ............................ 2-320258
Dec. 17, 1990 [JP] Japan ............................ 2-411191
Feb. 7, 1991 [JP] Japan ............................ 3-60879

[51] Int. Cl.$^5$ ............................................. B60G 11/18
[52] U.S. Cl. ................................... 280/723; 280/689
[58] Field of Search ............... 280/772, 688, 689, 723

[56] References Cited

U.S. PATENT DOCUMENTS

| | | | |
|---|---|---|---|
| 4,234,205 | 11/1980 | Thiesce | 280/723 |
| 4,486,030 | 12/1984 | Takata et al. | 280/689 |
| 4,637,628 | 1/1987 | Perkins | 280/689 |
| 5,048,859 | 9/1991 | Nishikuma et al. | 280/668 |

FOREIGN PATENT DOCUMENTS

| | | |
|---|---|---|
| 30582 | 7/1926 | France . |
| 2564785 | 11/1985 | France . |
| 63-41210 | 2/1988 | Japan . |
| 63-40210 | 3/1988 | Japan . |

Primary Examiner—Kenneth R. Rice
Attorney, Agent, or Firm—Oliff & Berridge

[57] ABSTRACT

A twist beam type rear suspension having a pair of trailing arms disposed to extend along opposite sides of a vehicle as pivotably supported from a vehicle body at front ends and supporting at rear ends rear vehicle wheels to be rotatable about respective axes of rotation, a twist beam connected between the pair of trailing arms and twistable about an axis of twisting, an assist link having a central portion disposed substantially transversely in the vehicle as supported from the vehicle body and opposite end portions movable relative to the vehicle body, and a pair of control links each having a first end pivotably connected with each trailing arms at its portion adjacent its front end and a second end pivotably connected with each end portion of the assist link, wherein the opposite end portions of the assist link are either movable in the longitudinal direction relative to the vehicle body in the same phase but unmovable in the longitudinal direction relative to the vehicle body in the phases opposite to one another and also unmovable in the transverse direction relative to the vehicle body or movable in the transverse direction relative to the vehicle body in the phases opposite to one another but unmovable in the transverse direction relative to the vehicle body in the same phase, a phantom straight line passing pivot centers of the pivoting connections at the first and second ends of each control link intersects one another at a point positioned transversely central in the vehicle and longitudinally in a region extending rearward from a point substantially around the axes of rotation of the vehicle wheels as viewed from the top of the vehicle, and a phantom straight line passing a pivot center of the pivoting support of the front end of each trailing arm and one of the first and second ends of each control link traverses the axis of twisting.

18 Claims, 19 Drawing Sheets

TWIST BEAM TYPE REAR SUSPENSION REINFORCED AGAINST SIDE FORCE WITH LONGITUDINAL COMPLIANCE

BACKGROUND OF THE INVENTION

1. Field of the Invention

The present invention relates to a rear suspension for a vehicle such as an automobile, and more particularly, to a twist beam type rear suspension.

2. Description of the Prior Art

A conventionally general twist beam type rear suspension has such a construction as shown in FIG. 17, wherein it comprises a pair of trailing arms 100R and 100L disposed along the opposite sides of a vehicle and a twist beam 102 extending transversely in the vehicle to be connected between said pair of trailing arms, with front ends of the trailing arms being pivotably supported from a vehicle body 108 via joints 106R and 106L. The joints 106R and 106L generally include cylindrical rubber bushes and define a transverse axis of pivoting 104. The rear ends of the trailing arms support vehicle wheels 110R and 110L, respectively, to be rotatable about respective axes of rotation 128 which are generally in coincidence with one another when the vehicle wheels are at their standard positions. The twist beam 102 is twistable about an axis of twisting 112 determined by the cross sectional shape thereof.

In such a twist beam type rear suspension, when the opposite vehicle wheels 110R and 110L bound or rebound relative to the vehicle body in the same phase as one another, the trailing arms 100R and 100L swing up and down about the axis of pivoting 104, whereas when the opposite vehicle wheels bound or rebound in the phases opposite to one another, the trailing arms 100R and 100L swing about phantom straight lines 118R and 118L, respectively, wherein the phantom straight line 118R is a phantom straight line passing a point of intersection 116 between the axis of twisting 112 and a phantom vertical center plane 114 of the vehicle and the pivot center of the joint 106, while the phantom straight line 118L is a phantom straight line passing said point of intersection 116 and the pivot center of the joint 106L. Therefore, the steering alignment of the suspension changes when the opposite vehicle wheels bound or rebound in the phases opposite to one another. In the opposite phase bounding or rebounding of the vehicle wheels, the twist beam 102 is twisted about the axis of twisting 112, functioning as a stabilizer.

In Japanese Utility Model Laying-open Publication 63-40210, a twist beam type rear suspension is disclosed to have such a construction as shown in FIG. 19. This suspension comprises, in addition to the basic construction of the conventionally general twist beam type rear suspension, a pair of control links 124R and 124L pivotably connected at first ends with the corresponding trailing arms 100R and 100L via joints 120R and 120L and pivotably connected at second ends with the vehicle body 108 via joints 122R and 122L, respectively, with the pivot centers of the joints 122R and 122L being positioned on the axis of pivoting 104, while phantom straight lines 126R and 126L passing the pivot centers of the opposite ends of the control links 124R and 124L, respectively, intersect one another at a point 130 positioned rearward of the axes of rotation 128 of the vehicle wheels as viewed from the top of the vehicle. In this case, the steering alignment of the vehicle wheels changes toward the understeering when a transverse force is applied to the vehicle wheels.

Referring again to FIG. 17 showing the conventionally general twist beam type rear suspension, denoting the distance between the axis of pivoting 104 of the trailing arms 100R and 100L and the axes of rotation 128 of the vehicle wheels by Ly, and denoting the distance between the pivot center of the joint 106R alternatively 106L and the phantom vertical center plane 114 by Lx, when a transverse force Fx is applied to the vehicle wheels 110R and 110L, longitudinal forces Fxr and Fxl are exerted at the joints 106R and 106L, respectively, said longitudinal forces each being of a magnitude of $Fx \cdot Ly/Lx$ and opposite to one another in the direction.

Due to these longitudinal forces the rubber bushes incorporated in the joints 106R and 106L are deformed, so that the suspension turns as a whole about a center point 132 between the joints 106R and 106L as illustrated by broken lines in FIG. 17, thereby shifting the opposite vehicle wheels 110R and 110L with respect to the steering alignment and the transverse position.

Although not illustrated in FIG. 17, a side force is also exerted to the joints 106R and 106L, so that the rubber bushes in these joints are also elastically deformed in the transverse direction, thereby shifting the suspension as a whole in the transverse direction.

Therefore, in order to improve the steering stability of the vehicle, the spring constant of the rubber bushes in the joints 106R and 106L need to be increased so that the shifting in the steering alignment and the transverse position of the vehicle wheels due to a transverse force applied to the vehicle wheels is minimized.

On the other hand, as shown in FIG. 18, which shows the same suspension as shown in FIG. 17, when a longitudinal force Fy is applied to the vehicle wheels 110R and 110L, longitudinal forces Fyr and Fyl of the same magnitude are exerted in the joints 106R and 106L, respectively. Therefore, the rubber bushes in the joints 106R and 106L are elastically deformed due to these longitudinal forces, so that the suspension is shifted as a whole in the longitudinal direction as illustrated by broken lines in FIG. 18.

It is generally required that a relatively large longitudinal compliance is available in the suspension for improving the riding comfortableness of the vehicle. Therefore, in order to improve the riding comfortableness in the conventionally general twist beam type rear suspension, the spring constant of the rubber bushes in the joints at the front ends of the trailing arms need to be decreased.

Therefore, in the conventionally general twist beam type rear suspension there is an inconsistency in that the rubber bushes in the joints at the front ends of the trailing arms are to be harder from the view point of improving the steering stability of the vehicle, while they are to be softer from the view point of improving the riding comfortableness of the vehicle.

In the twist beam type rear suspension described in the above-mentioned Japanese Utility Model Laying-open Publication 63-40210, a transverse force applied to the vehicle wheels shifts the steering alignment toward the understeering, as the instant center of turning of the suspension as a whole is positioned at the point of intersection 130 of the axes of the pair of control links 124R and 124L, contributing to the steering stability of the vehicle. Or, if the point of intersection 130 is positioned on the axes of rotation of the vehicle wheels as viewed from the top of the vehicle, the transverse rigidity of the suspension is improved.

However, when a longitudinal force is applied to the vehicle wheels, the opposite control links are pulled or compressed in the same way, and therefore, the suspension can not shift longitudinally, if the joints 120R, 120L, 122R and 122L are constructed to be hard enough to provide the above-mentioned improvement in the steering stability of the suspension, and therefore, no longitudinal compliance is available in the suspension, and no improvement of the riding comfortableness is available. This situation is not compensated for by the condition that the point of intersection 130 is positioned rearward of the axes of rotation 128 of the vehicle wheels as shown in FIG. 19.

Further, in this construction, when the vehicle wheels bound or rebound in the phases opposite to one another, the trailing arms 100R and 100L would swing about the phantom straight lines 118R and 118L, respectively. However, the control links 124R and 124L connected with the trailing arms 100R and 100L at the joints 120R and 120L and with the vehicle body 108 at the joints 120R and 120L, respectively, not positioned on the phantom straight line 118R or 118L, will restrict the swinging movement the trailing arms 100R and 100L, generating the so called link interference.

SUMMARY OF THE INVENTION

In view of the above-mentioned problems in the conventionally general twist beam type rear suspension and the twist beam type rear suspension described in the above-mentioned Japanese Utility Model Laying-open Publication 63-40210, it is the object of the present invention to provide a twist beam type rear suspension which is improved in both the steering stability and the riding comfortableness, with no generation of the link interference.

According to the present invention, the above-mentioned object is accomplished by a twist beam type rear suspension comprising a pair of trailing arms disposed to extend along opposite sides of a vehicle as pivotably supported from a vehicle body at front ends thereof and supporting at rear ends thereof rear vehicle wheels to be rotatable about respective axes of rotation thereof extending transversely in the vehicle, a twist beam connected between said pair of trailing arms and twistable about an axis of twisting thereof, an assist link having a central portion disposed substantially transversely in the vehicle as supported from the vehicle body and opposite end portions movable relative to the vehicle body, and a pair of control links each having a first end pivotably connected with each said trailing arm at a portion thereof adjacent said front end thereof and a second end pivotably connected with each said end portion of said assist link, wherein said opposite end portions of said assist link are either movable in the longitudinal direction relative to the vehicle body in the same phase but unmovable in the longitudinal direction relative to the vehicle body in the phases opposite to one another and also unmovable in the transverse direction relative to the vehicle body or movable in the transverse direction relative to the vehicle body in the phases opposite to one another but unmovable in the transverse direction relative to the vehicle body in the same phase, a phantom straight line passing pivot centers of the pivoting connections at said first and second ends of each said control link intersects one another at a point positioned transversely central in the vehicle and longitudinally in a region extending rearward from a point substantially around said axes of rotation of said vehicle wheels as viewed from the top of the vehicle, and a phantom straight line passing a pivot center of the pivoting support of said front end of each said trailing arm and one of said first and second ends of each said control link traverses said axis of twisting.

In the above-mentioned construction, when a transverse force is applied to the vehicle wheels, the pivot points at the first ends of the control links would shift substantially in the same manner as the front ends of the trailing arms, i.e. in the longitudinal direction in the phases opposite to one another and also in the transverse direction in the same phase. According to this, the pivot points at the second ends of the control links would also shift in the longitudinal direction in the phases opposite to one another and in the same transverse direction as one another as driven through the control links. However, the pivot points between the second ends of the control links and the end portions of the assist link are either movable in the longitudinal direction relative to the vehicle body in the same phase but unmovable in the longitudinal direction relative to the vehicle body in the phases opposite to one another and also unmovable in the transverse direction relative to the vehicle body or movable in the transverse direction relative to the vehicle body in the phases opposite to one another but unmovable in the transverse direction relative to the vehicle body in the same phase. Therefore, the link system composed of the pair of control links and the assist link presents a rigid link structure against the transverse force applied to the vehicle wheels.

As rigidly reinforced by the above-mentioned link system, according to the transverse force applied to the vehicle wheels, the suspension would turn as a whole about the point of intersection of the phantom straight lines each passing the pivot points at the first and second ends of each said control link. Therefore, when this point of intersection is positioned on or substantially around the axes of rotation of the vehicle wheels as viewed from the top of the vehicle, the suspension does not turn at all under the transverse force applied to the vehicle wheels. When said point of intersection is positioned rearward of the axes of rotation of the vehicle wheels as viewed from the top of the vehicle, the suspension would turn as a whole within an angle allowed by the elasticity of the joints 16R and 16L under the transverse force applied to the vehicle wheels, said turn of the suspension being in the direction of turning the rear vehicle wheels suspended thereby to attenuate the steering effect by the front steering vehicle wheels in a turning. This contributes to the steering stability of the vehicle.

When a longitudinal force is applied to the vehicle wheels, the suspension would shift in the longitudinal direction as a whole, and therefore, the pivot points at the connection between the second ends of the control links and the end potions of the assist link are driven rearward by the control links and would shift in the longitudinal direction in the same phase and also in the transverse direction in the phases opposite to one another. The pivot points at the connection between the second ends of the control links and the end potions of the assist link are either movable in the longitudinal direction relative to the vehicle body in the same phase when unmovable in the transverse direction relative to the vehicle body or movable in the transverse direction relative to the vehicle body in the phases opposite to one another when unmovable in the transverse direction relative to the vehicle body in the same phase. Therefore, the link system composed of the pair of control links and the assist link presents no substantial resistance to the movement of the suspension in the longitudinal direction, allowing any desired longitudinal compliance being incorporated in the front end joints of the trailing arms without affecting the transverse rigidity of the suspension.

When the opposite vehicle wheels bound or rebound in the same phase, the pivot points at the connection between the trailing arms and the first ends of the control links move about the axis of pivoting, thereby pulling the first ends of the control links generally forward relative to the vehicle body. However, since the pivot connections between the second ends of the control links and the end portions of the assist link are either movable in the longitudinal direction relative to the vehicle body in the same phase when unmovable in the transverse direction relative to the vehicle body or movable in the transverse direction relative to the vehicle body in the phases opposite to one another when unmovable in the transverse direction relative to the vehicle body in the same phase, the link system composed of the pair of control links and the assist link presents no substantial resistance against the bounding or rebounding of the opposite vehicle wheels in the same phase.

When only one of the opposite vehicle wheels bounds or rebound, the opposite vehicle wheels bound or rebound unsymmetrically, or the opposite vehicle wheels bound or rebound symmetrically but in the phases opposite to one another, the twist beam is twisted, and each the trailing arm swings about the phantom straight line passing the pivot center of the pivoting support of said front end of each said trailing arm and one of said first and second ends of each said control link traverses said axis of twisting. Therefore, also in this case the link system composed of the pair of control links and the assist link presents no substantial resistance against the bounding or rebounding of the vehicle wheels.

According to a first embodiment of the present invention, said assist link may comprise a rod portion providing said central portion thereof, said rod portion being supported from the vehicle body to be rotatable relative to the vehicle body about its own axis but not movable relative to the vehicle body along its own axis, and a pair of arm portions extending from opposite ends of said rod portion substantially at right angle thereto so as to provide said opposite end portions of said assist link, said arm portions extending substantially vertically in the vehicle.

Or, according to a second embodiment of the present invention, said assist link may comprise a pair of assist link members each including a transverse portion providing a half of said central portion thereof and an angled portion integrally connected at one end of said transverse portion as inclined relative to said transverse portion to provide said end portion thereof, each said transverse portion having a sectoral gear at a free end thereof opposite to said one end integrally connected with said angled portion, each said assist link member being supported from the vehicle body at a portion where said transverse portion is joined with said angled portion to be pivotable about a pivoting axis while each said sectoral gear is meshed with one another.

The above-mentioned second embodiment may be so modified that said assist link comprises a pair of assist link members each including a transverse portion providing a half of said central portion thereof and an angled portion integrally connected at one end of said transverse portion as inclined relative to said transverse portion to provide said end portion thereof, said transverse portion of one of said assist link members having a ball at a free end thereof opposite to said one end integrally connected with said angled portion, said transverse portion of the other of said assist link members having a groove at a free end thereof opposite to said one end integrally connected with said angled portion for receiving said ball of said one assist link member, each said assist link member being supported from the vehicle body at a portion where said transverse portion is joined with said angled portion to be pivotable about a pivoting axis while each said sectoral gear is meshed with one another.

According to a third embodiment of the present invention, said assist link may comprise a first link member having first and second arm portions extending substantially in opposite orientations from a central portion where said first and second arm portions are joined with one another, a second link member having third and fourth arm portions extending substantially in a same orientation from a central portion where said third and fourth arm portions are joined with one another, and a third link member pivotably connected at opposite ends thereof with outer an end of said first arm portion of said first link member remote from said central portion thereof and an outer end of said third arm portion of said second link member remote from said central portion thereof, said first and second link members being pivotably supported from the vehicle body at said central portions thereof, wherein said second arm portion of said first link member and said fourth arm portion of said second link member provide said end portions of said assist link.

In the above-mentioned second and third embodiments, said pivoting axis of each said assist link member may be oriented horizontally and longitudinally in the vehicle.

Or, in the above-mentioned second and third embodiments, said pivoting axis of each said assist link member may be vertically.

In all the above-mentioned embodiments and modifications thereof, the phantom straight line passing the pivot center of the pivoting support of said front end of each said trailing arm and one of said first and second ends of each said control link may traverse said axis of twisting at a point transversely central in the vehicle.

In all the above-mentioned embodiments and modifications thereof, the phantom straight line passing the pivot center of the pivoting support of said front end of each said trailing arm and said first end of each said control link may traverse said axis of twisting.

In all the above-mentioned embodiments and modifications thereof, the phantom straight line passing the pivot center of the pivoting support of said front end of each said trailing arm and said second end of each said control link may traverse said axis of twisting.

In all the above-mentioned embodiments and modifications thereof, the pivot center of said second end of each said control link may be positioned ahead of said twist beam and the pivot center of said first end of each said control link may be positioned ahead of the pivot center of said second end of each said control link, as viewed from the top of the vehicle.

BRIEF DESCRIPTION OF THE DRAWINGS

In the accompanying drawings,

FIGS. 17 and 18 are plan views showing the conventionally general twist beam type rear suspension in the form of a skeleton figure, wherein FIG. 17 shows a condition where a transverse force is applied to the vehicle wheels, while FIG. 18 shows a condition where a longitudinal force is applied to the vehicle wheels.

DESCRIPTIONS OF THE PREFERRED EMBODIMENTS

In the following, the present invention will be described in more detail with reference to the accompanying drawing.

Figure 1:
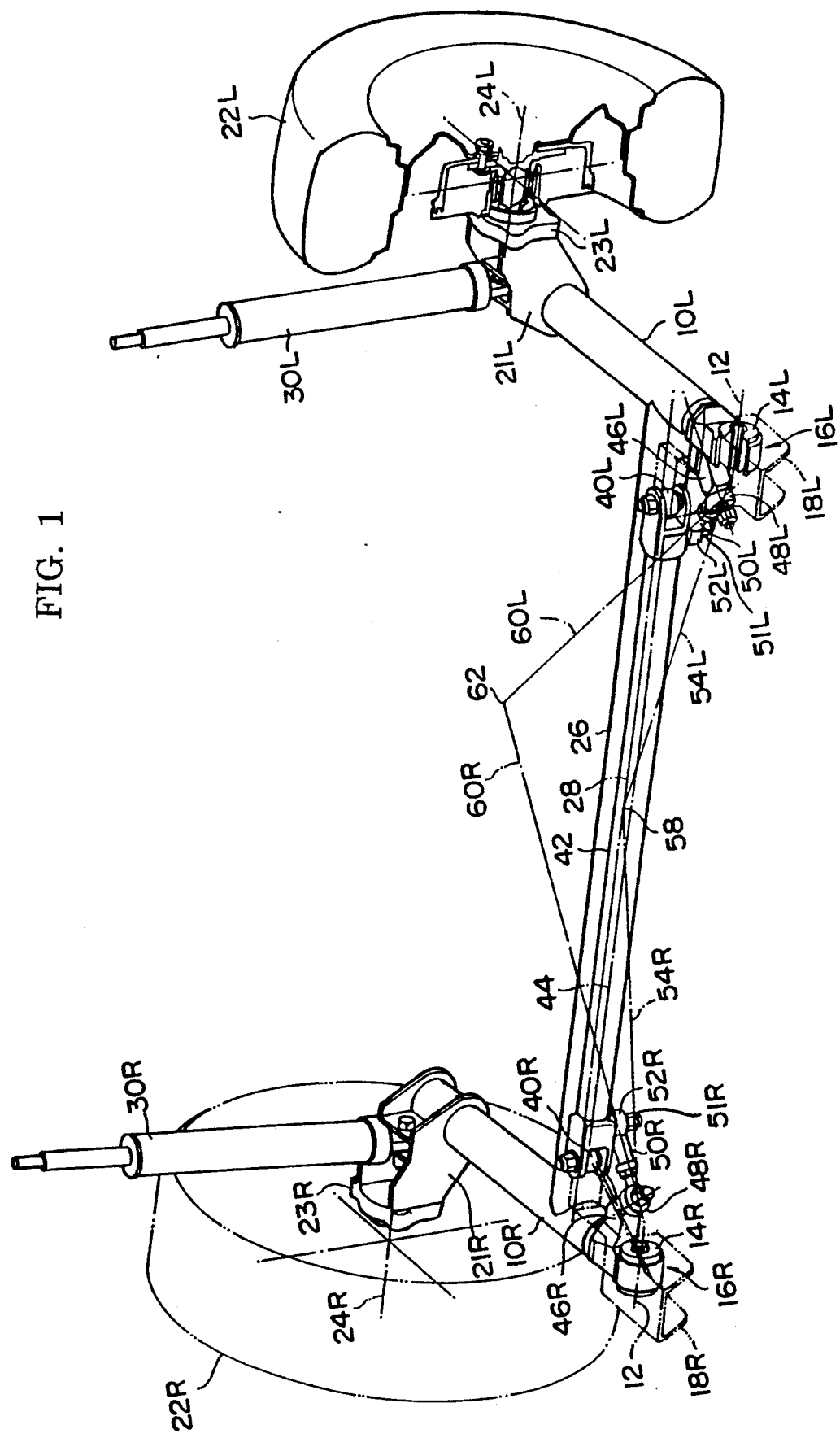
FIG. 1 is a perspective view showing a first embodiment of the twist beam type rear suspension according to the present invention with parts thereof being broken away.

Referring to FIG. 1 showing a first embodiment of the twist beam type rear suspension according to the present invention, 10R and 10L are a pair of trailing arms disposed to extend along opposite sides of a vehicle as transversely spaced from one another. Front ends of these trailing arms 10R and 10L are pivotably supported from a vehicle body, not shown in FIG. 1, by joints 16R and 16L including cylindrical rubber bushes 14R and 14L which define an axis for pivoting 12 extending transversely in the vehicle, and brackets 18R and 18L, respectively. Rear ends of the trailing arms support vehicle wheels 22R and 22L via brackets 21R and 21L and axles 23R and 23L, respectively, so that the vehicle wheels 22R and 22L can rotate about axes of rotation 24R and 24L extending transversely in the vehicle, respectively. The trailing arms 10R and 10L are firmly connected with opposite ends of a twist beam 26 which has an axis of twisting 28 determined by the cross sectional shape thereof. The twist beam 26 functions as a stabilizer as being twisted about the axis of twisting thereof.

Shock absorbers 30R and 30L are provided between the rear ends of the trailing arms 10R and 10L, respectively, and the vehicle body not shown in the figure. The stock absorbers have each a lower sheet and a compression coil spring, both not shown in the figure, the spring acting as a suspension spring provided between the lower sheet and an upper sheet, not shown in the figure, mounted to the vehicle body.

Figure 2:
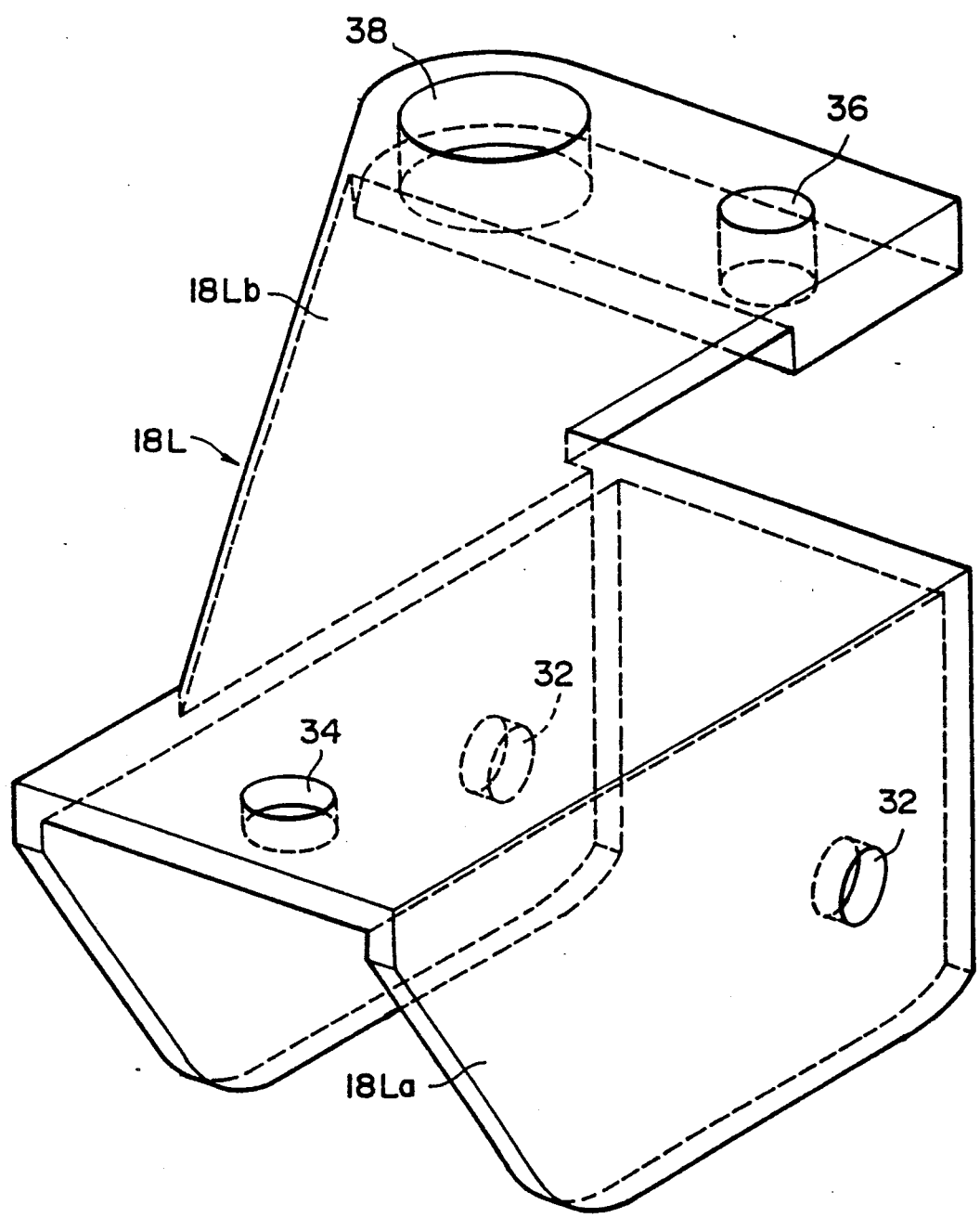
FIG. 2 is an enlarged perspective view of the mounting bracket at one side shown in FIG. 1.

In FIG. 2, the bracket 18L is shown in the form of a member before assembly. It comprises a body portion 18La of an inverse channel construction to support the rubber bush 14L therein via a bolt, not shown in the figure, inserted through a pair of aligned bolt holes 32 and a lug portion 18Lb extending in the same plane as the upper wall of the body portion 18La to be integral therewith. The bracket is formed with bolt holes 34 and 36 and is mounted to the vehicle body by bolts, not shown in the figure, inserted to these bolt holes. The lug portion 18Lb is formed with a ball joint hole 38 in which a ball joint 40L is received. The bracket 18R is formed in the construction of a mirror image symmetry relative to the bracket 18L with a similar ball joint hole in which a ball joint 40R is received.

The ball joints 40R and 40L are mounted to corresponding ends of a rod like central portion of an assist link 42 by bolts and nuts, said assist link extending on the front side of the twist beam 26 in parallel thereto, so that rod like central portion of the assist link 42 is supported from the vehicle body via the brackets 18R and 18L to be movable relative to the vehicle body only to turn about its longitudinal axis 44 via the ball joints 40R and 40L.

A pair of arms 46R and 46L are provided as integrally connected to the trailing arms 10R and 10L, respectively, to extend obliquely inwardly from portions thereof close to the front ends thereof. The inner ends of the arms 46R and 46L are pivotably connected with first ends of control links 50R and 50L via ball joints 48R and 48L, respectively. Second ends of the control links are pivotably connected with corresponding ends of the assist link via ball joints 52R and 52L mounted to bolts 51R and 51L planted to the opposite ends to the rod like central portion of the assist link to extend downward from the opposite ends of the rod like central portion of the assist link as offset vertically downward from the axis 44 of the rod like central portion of the assist link 42. Of course the assist link may be formed with a pair of integral arms instead of said bolts 51R and 51L planted thereto for mounting the ball joints 52R and 52L as offset downward from the axis 44 thereof. Further, although in the shown embodiment the bolts 51R and 51L extend downward from the opposite ends of the rod like central portion of the assist link 42, such bolts or integral arms may extend upward from the opposite ends of the rod like central portion of the assist link 42. It is essential in this embodiment that the pivot centers of ball joints 52R and 52L are vertically offset from the axis 44 about which the central portion of the assist link supported from the vehicle body can turn.

Figure 3:
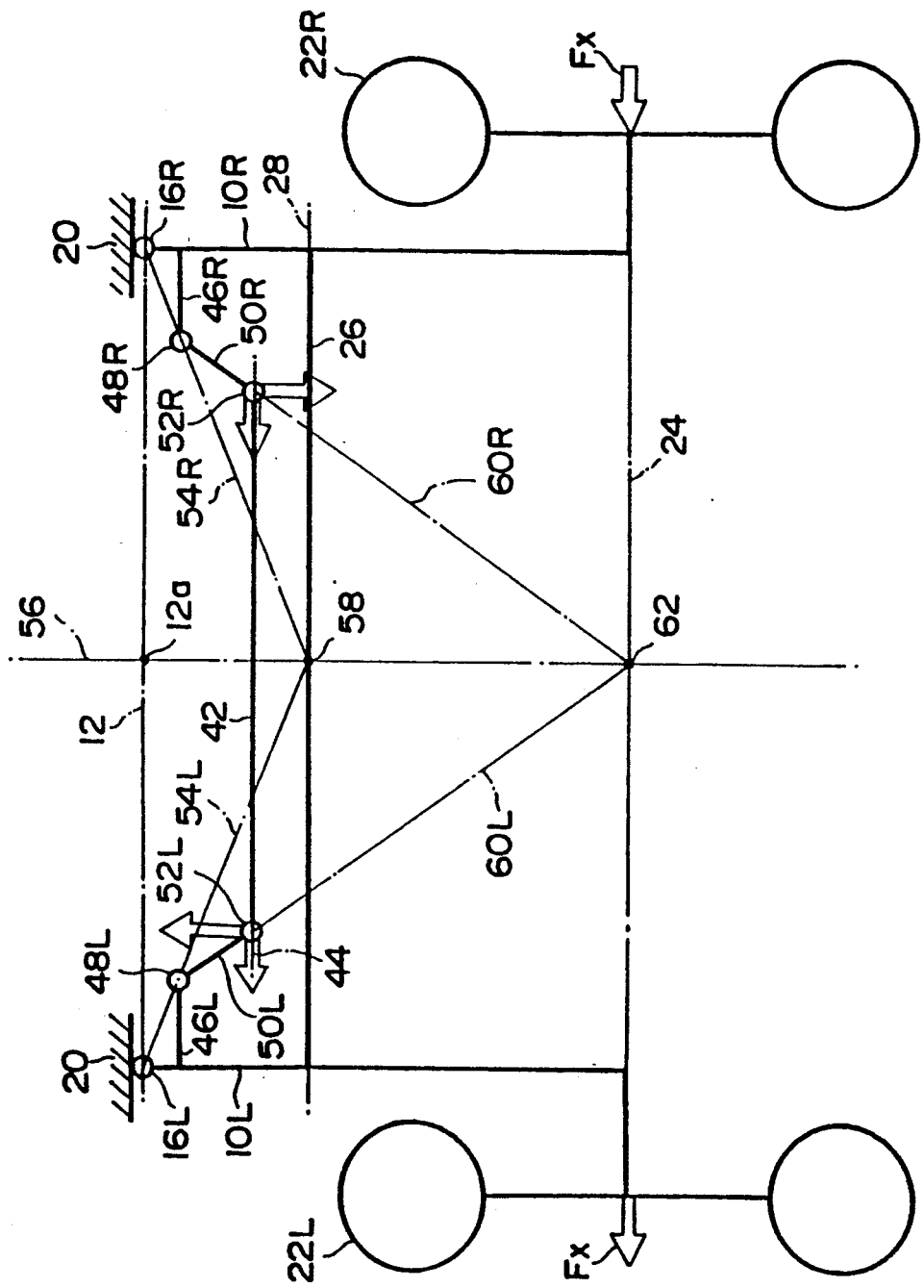
FIG. 3 is a plan view showing the first embodiment shown in FIG. 1 in the form of a skeleton figure, illustrating a condition where a transverse force is applied to the vehicle wheels.

Referring to FIG. 3, illustrating schematically the suspension shown in FIG. 1, phantom straight lines 54R and 54L passing the pivot points of the first ends of the control links 50R and 50L, i.e. the centers of the ball joints 48R and 48L, and the pivot points of the front ends of the trailing arms 10R and 10L, i.e. the centers of the joints 16R and 16L, respectively, intersect one another at a point 58 which is a point where the axis of twisting 28 of the twist beam 26 traverses a phantom vertical longitudinal center plane 56.

Further, phantom straight lines 60R and 60L passing the pivot points at the opposite ends of the control links 50R and 50L, i.e. the centers of the ball joints 48R and 48L and the centers of the ball joints 52R and 52L, intersect one another at a point 62 which coincides with the position where the axes of rotation 24 of the vehicle wheels traverse the center plane 56, as viewed from the top of the vehicle.

As shown in FIG. 3, in this first embodiment, when a transverse force Fx is applied to the vehicle wheels 22R and 22L, the suspension would turn first as a whole about the center point 12a between the joints 16R and 16L, as viewed in the plan view, and the suspension would also shift as a whole in the same direction as the transverse force Fx.

When the suspension would turn about the center point 12a, the ball joints 48R and 48L would shift in a substantially longitudinal direction in the phases opposite to one another, whereby the ball joints 52R and 52L would shift in the longitudinal direction in the phases opposite to one another and also in the transverse direction in the same phase. At the same time, when the suspension would shift in the transverse direction, the ball joints 48R and 48L would shift in the transverse direction in the same phase, whereby the ball joints 52R and 52L would be driven by the control links 50R and 50L in the longitudinal direction in the phases opposite to one another and in the transverse direction in the same phase. Therefore, when a transverse force is applied to the vehicle wheels, the ball joints 52R and 52L would shift in the longitudinal direction in the phases opposite to one another and in the transverse direction in the same phase.

However, since the ball joints 52R and 52L are supported by the assist link 42 which can only turn about the axis 44 thereof but can move in neither the longitudinal nor the transverse directions, and since the ball joints 52R and 52L offset from the axis 44 of the assist link 42 on the same side thereof would turn the assist link 42 about the axis in opposite directions, respectively, the ball joints 52R and 52L can move in neither transverse nor longitudinal direction. Therefore, when a side force is applied to the vehicle wheels, the ball joints 52R and 52L remain as virtually fixed to the vehicle body, and therefore, the suspension would turn as a whole about the point of intersection 62 of the phantom straight lines 60R and 60L which are the extensions of the axes of the control links 50R and 50L, respectively. Therefore, if the point 62 is positioned on the axes of rotation 24 of the vehicle wheels along which the side force Fx acts, the suspension does not turn at all. Or, if the point 62 is positioned on the rear side of the axes of rotation 24 of the vehicle wheels, the transverse force Fx which will be applied to the vehicle wheels in a left turn of the vehicle would turn the rear suspension about the point 62 in the anticlockwise direction as viewed in FIG. 3, thereby shifting the steering alignment of the vehicle wheels toward the understeering.

Thus, the rigidity of the suspension in the transverse direction is ensured, or the steering stability of the rear suspension is improved, regardless of the spring constant of the joints at the front ends of the trailing arms.

Figure 4:
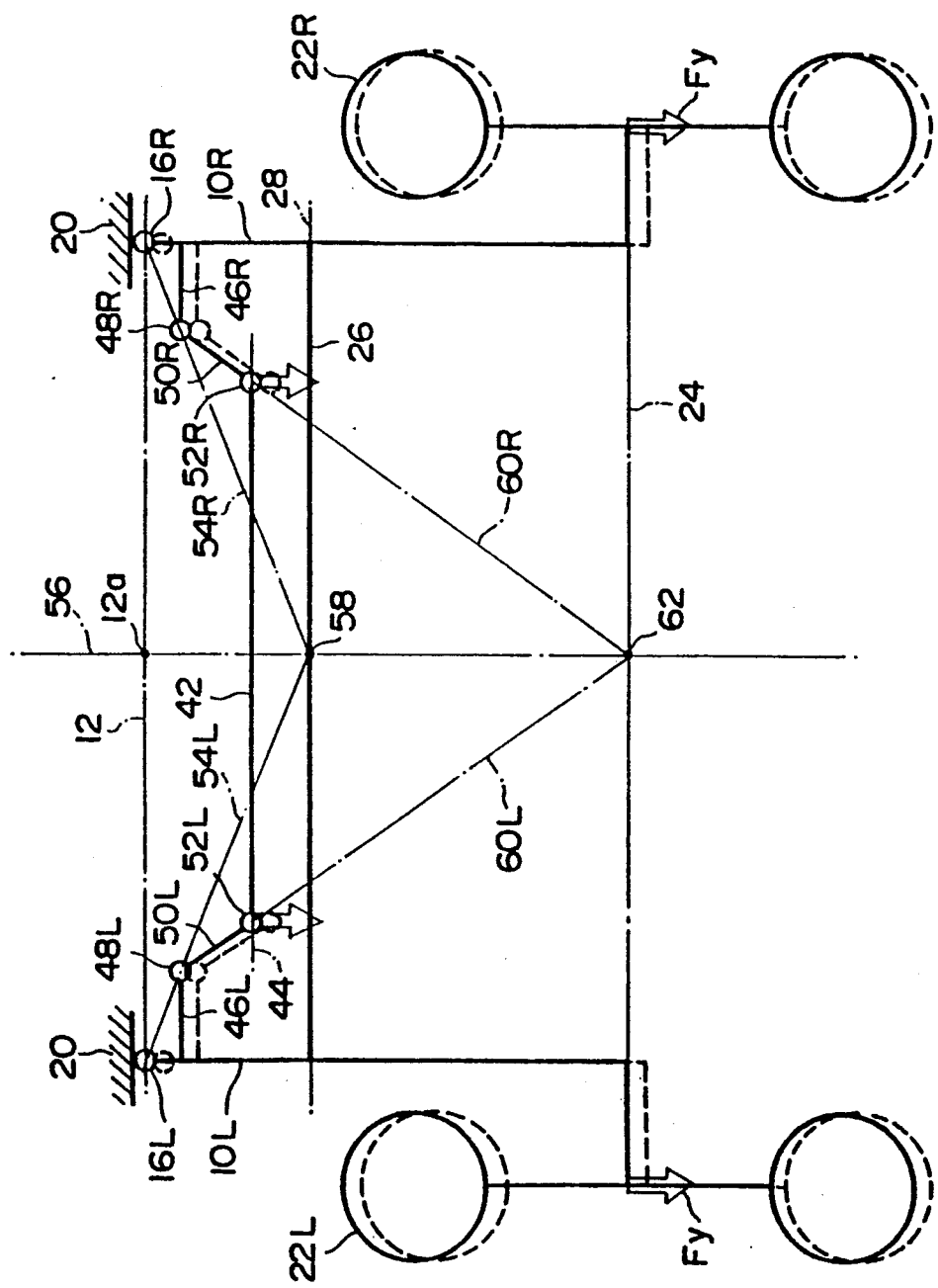
FIG. 4 is the same view as FIG. 3, illustrating a condition where a longitudinal force is applied to the vehicle wheels.

When a longitudinal force is applied to the vehicle wheels, as shown in FIG. 4, the suspension would shift in the same longitudinal direction as the longitudinal force like Fy. When the suspension would shift as a whole in the longitudinal direction, the ball joints 48R and 48L would shift in the same longitudinal direction in the same phase, and therefore, the ball joints 52R and 52L are driven via the control links 50R and 50L in the same longitudinal direction and in the transverse directions opposite to one another.

Since the ball joints 52R and 52L are supported by the assist link 42 which can not move in the transverse directions but can turn about the axis 44 thereof, the ball joints 52R and 52L would readily turn about the axis 44. Therefore, when a longitudinal force is applied to the vehicle wheels, the control links 50R and 50L do not hinder the longitudinal shifting of the trailing arms 10R and 10L. Therefore, the trailing arms 10R and 10L shift in the longitudinal direction only according to the spring constant of the joints 16R and 16L.

Thus, by appropriately determining the spring constant of the joints at the front ends of the trailing arms, a desired longitudinal compliance is available in the suspension, independently of the control links.

Further, in the first embodiment, since the ball joints 48R and 48L at the first ends of the control links 50R and 50L are positioned on the phantom straight lines 54R and 54L about which the trailing arms 10R and 10L would turn when the vehicle wheels 22R and 22L bound or rebound in the phases opposite to one another, respectively, the control links 50R and 50L do not restrict the up or down swinging movement of the trailing arms 10R and 10L in the bounding or rebounding of the vehicle wheels in the phases opposite to one another, thus generating no link interference.

Further, in the first embodiment, since the ball joints 52R and 52L at the second ends of the control arms 50R and 50L can turn together with the assist link 42 in the same direction about the axis 44 thereof, when the opposite vehicle wheels bound or rebound in the same phase so that the opposite trailing arms swing in the same phase, the control links 50R and 50L do not restrict the up or down swinging movement of the trailing arms, thus generating no link interference.

Figure 5:
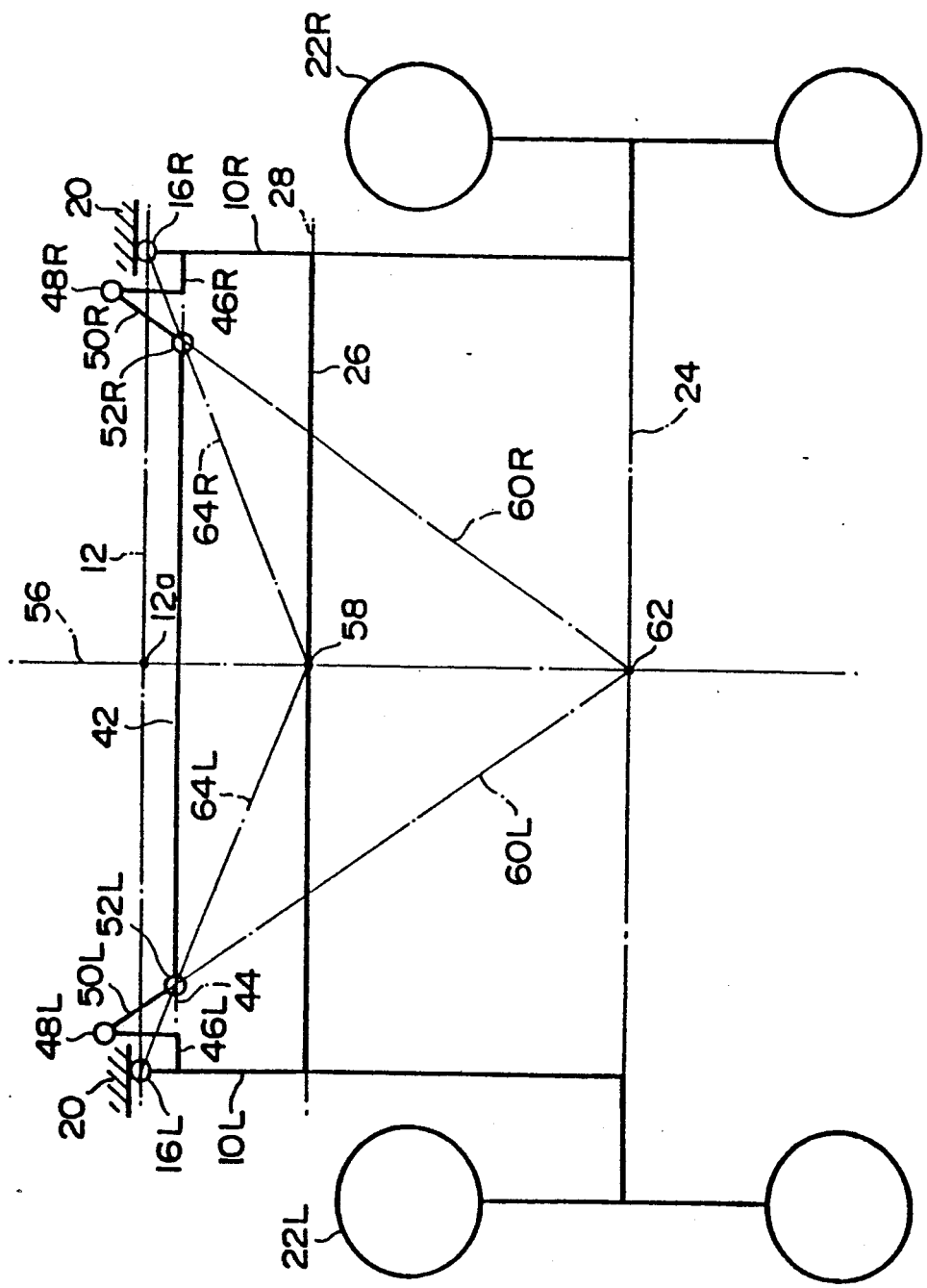
FIGS. 5 through 7 are plan views similar to FIG. 3 showing modifications of the first embodiment in the plan views similar to FIG. 3.
Figure 6:
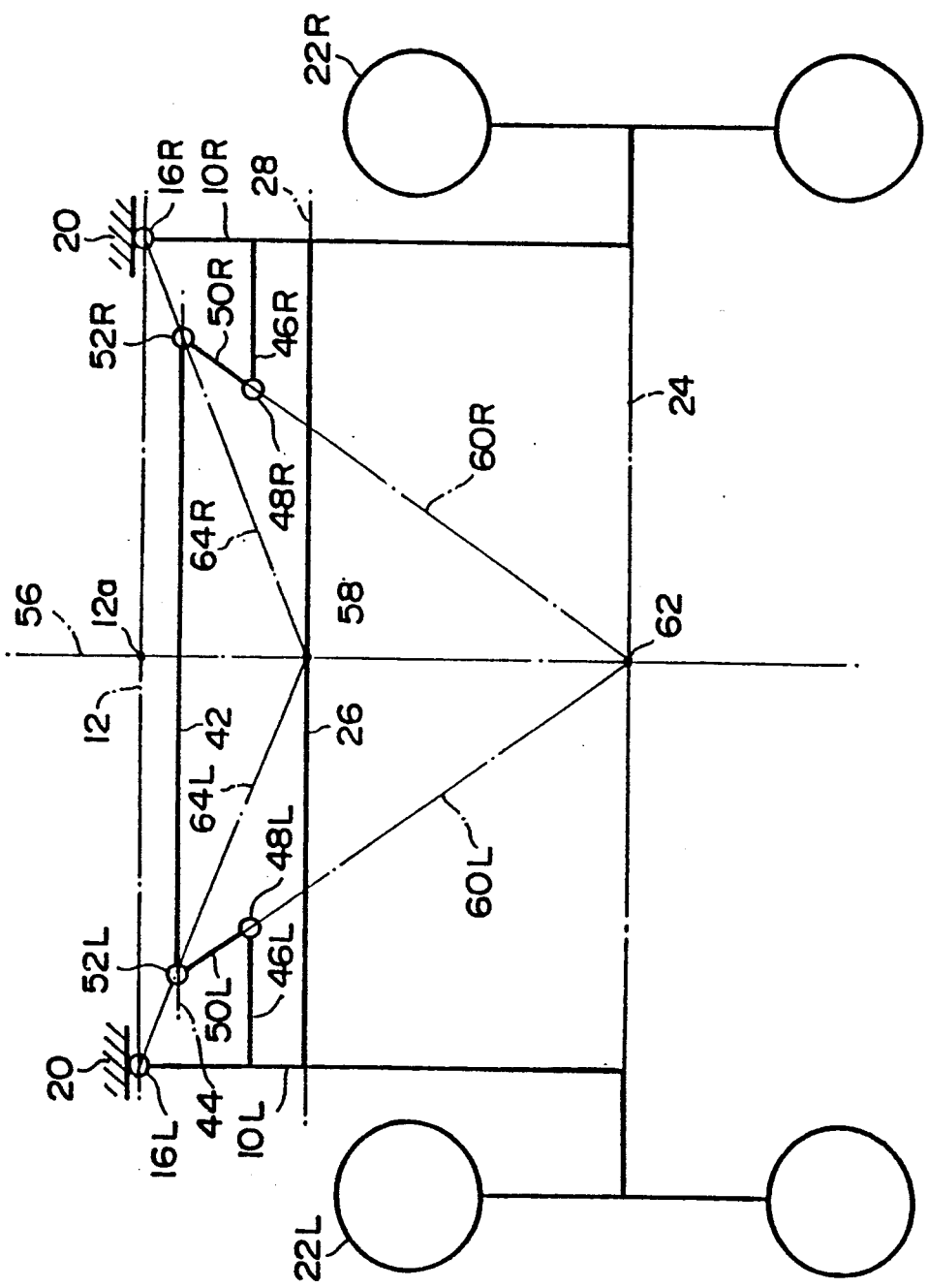
Figure 7:
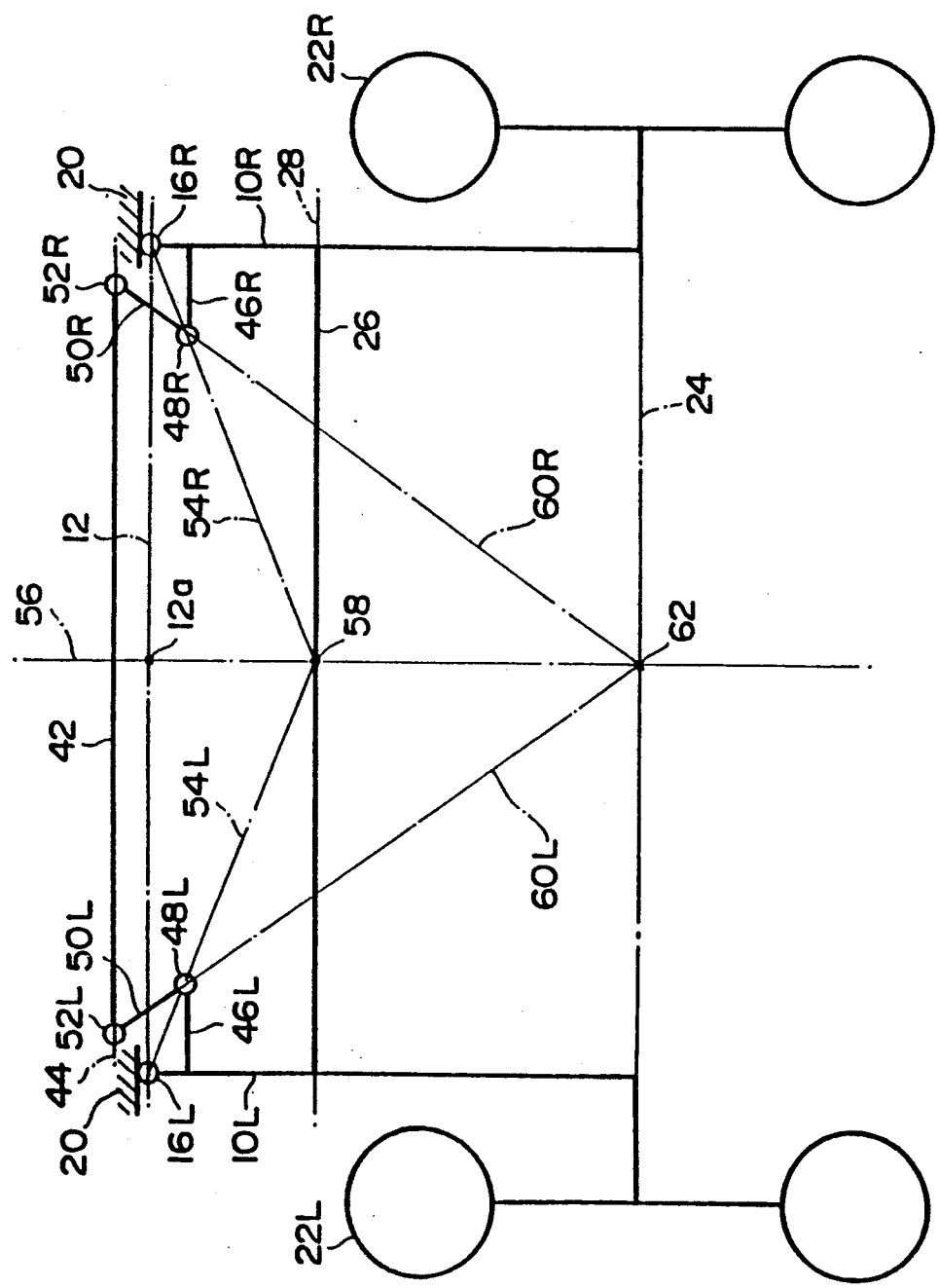

FIGS. 5 through 7 are plan views similar to FIG. 3, showing second through fourth embodiments of the twist beam type rear suspension according to the present invention. In these figures, the portions substantially corresponding to the those shown in FIG. 3 are designated by the same reference numerals.

In the second embodiment shown in FIG. 5, the arms 46R and 46L extend forward beyond the front ends of the trailing arms 10R and 10L, and phantom straight lines 64R and 64L passing the pivot centers of the front ends of the trailing arms 10R and 10L, i.e. the centers of the joints 16R and 16L, and the pivot centers of the second ends of the control links 50R and 50L, i.e. the centers of the ball joints 52R and 52L, intersect one another at the point 58 on the axis of twisting 28 of the twist beam 26.

In the third embodiment shown in FIG. 6, the arms 46R and 46L extend from portions of the trailing arms closer to the twist beam 26 to be longer than those in the first embodiment, and the assist link 42 is positioned on the front side of the arms 46R and 46L. Also in this embodiment, as in the second embodiment, the phantom straight lines 64R and 64L passing the pivot points at the front ends of the trailing arms 10R and 10L and the second ends of the control links 50R and 50L intersect one another at the point 58 positioned on the axis of twisting 28 of the twist beam 26.

In the fourth embodiment shown in FIG. 7, the assist link 42 is positioned on the front side of the front ends of the trailing arms 10R and 10L. Also in this embodiment, as in the first embodiment, the phantom straight lines 54R and 54L passing the pivot points of the front ends of the trailing arms 10R and 10L and the pivot points of the first ends of the control arms 50R and 50L intersect one another at the point 58 on the axis of twisting 28 of the twist beam 26.

The other constructions of the second through fourth embodiments are the same as those of the first embodiment.

Therefore, also in these embodiments, the transverse rigidity of the suspension is ensured independently of the spring constant of the joints at the front ends of the trailing arms, so that the longitudinal compliance independent of the control arms is available in the suspension. Further, when the opposite vehicle wheels bound or rebound in the same phase or in the phases opposite to one another, the control arms 50R and 50L do not restrict the up or down swinging movement of the trailing arms, thus generate no link interference.

The ball joints 52R and 52L at the second ends of the control links 50R and 50L may be offset vertically upward, instead of downward, from the axis 44 of the assist link 42.

Further, although in the shown embodiments the phantom straight lines 54R and 54L or 64R and 64L passing the centers of the joints at the front ends of the trailing arms and the centers of either the first or the second ends of the control links intersect one another at the point 58 where the axis of twisting 28 of the twist beam 26 traverses the center plane 56, they may intersect the axis of twisting 28 at respectively different points. In such a case, if those phantom straight lines intersect the axis of twisting 28 at positions equally distant from the point 58, no link interference is generated when the opposite vehicle wheels bound or rebound in the same phase, while the link interference is minimized when the opposite vehicle wheels bound or rebound in the phases opposite to one another.

Figure 8:
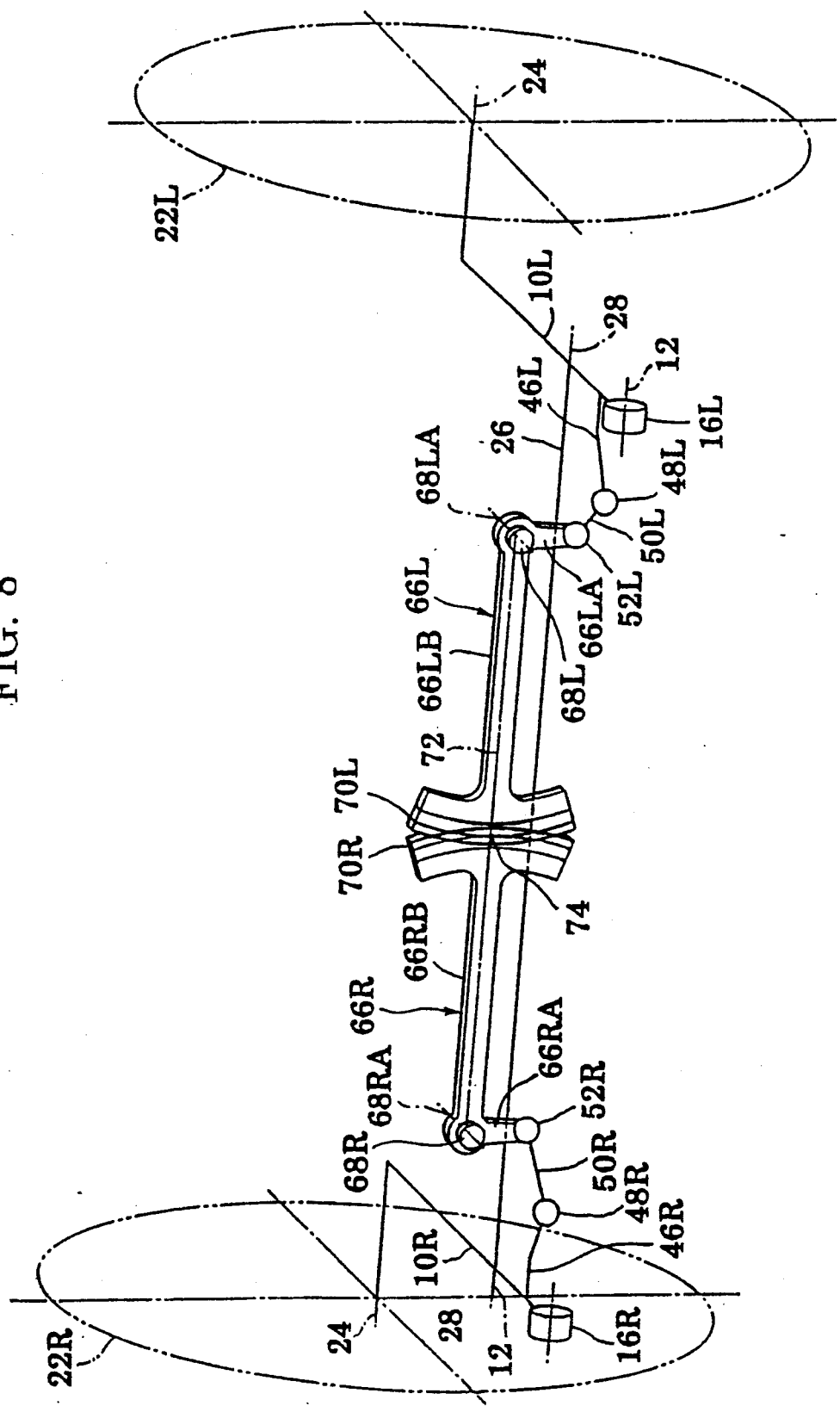
FIG. 8 is a perspective view showing a second embodiment of the twist beam type rear suspension according to the present invention in the form of a skeleton except the assist link.

FIG. 8 is a perspective view showing a fifth embodiment of the present invention in the form of a skeleton, except the assist link in which this embodiment is varied from the preceding embodiments. In FIG. 8, the portions corresponding to those in the preceding embodiments are designated by the same reference numerals and operate substantially in the same manner as those in the preceding embodiments.

Figure 9:
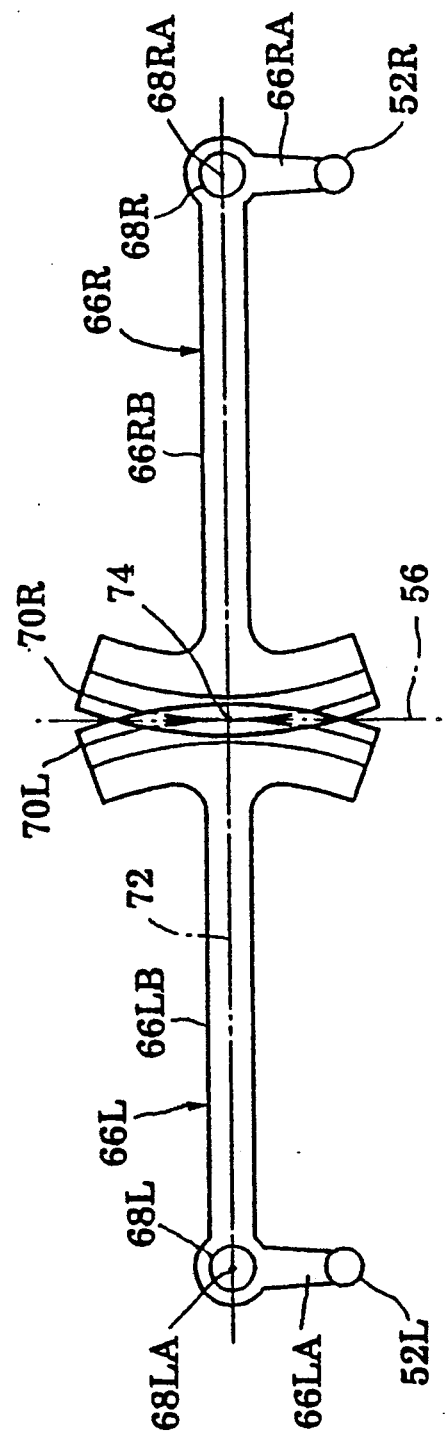
FIG. 9 is an enlarged front view of the assist link included in the suspension shown in FIG. 8.

In this embodiment, the assist link is substantially different from the assist link 42 in the preceding embodiments and now comprises two assist link members designated by reference numerals 66R and 66L. As shown in FIGS. 8 and 9, the assist link members 66R and 66L have vertical arm portions 66RA and 66LA and horizontal arm portions 66RB and 66LB, and are pivotably supported from the vehicle body, not shown in both figures, by pivot shafts 68R and 68L to be pivotable only about pivot axes 68RA and 68RL extending longitudinally in the vehicle, respectively. Sectoral gears 70R and 70L are provided at free ends of the horizontal arm portions 66RB and 66LB remote from the vertical arm portions to mesh with one another. The assist link members 66R and 66L are so arranged that, when the vehicle wheels 22R and 22L are at the standard position with neither bounding nor rebounding, the horizontal arm portions 66RB and 66LB align along a phantom straight line 72 connecting the centers of the pivot shafts 68R and 68L. 74 is the meshing point between the sectoral gears 70R and 70L and is positioned on the line 72. Free ends of the vertical arm portions 66RA and 66LA remote from the horizontal arm portions are pivotably connected with the second ends of the control links 50R and 50L via the ball joints 52R and 52L, respectively.

As is apparent from the assist link shown in the figures and described above, the pivot points between the vertical arm portions 66RA and 66LA and the second ends of the control links 50R and 50L, i.e. the centers of the ball joints 52R and 52L, can move only in the transverse direction of the vehicle in the phases opposite to one another.

Figure 10:
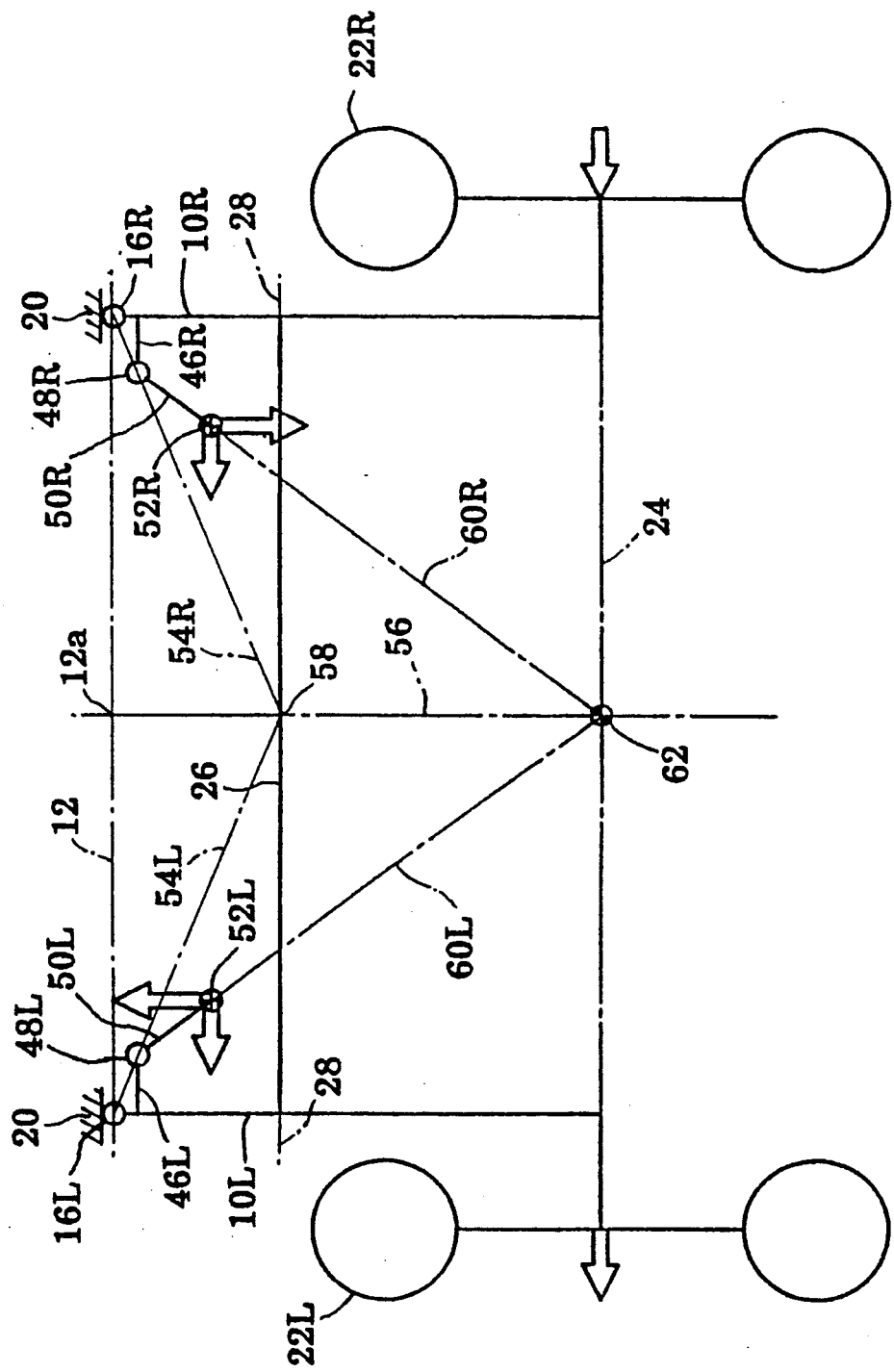
FIG. 10 is a plan view, similar to FIG. 3, of the suspension shown in FIG. 8 in the form of a skeleton figure and omitting the assist link for the purpose of clarity of illustration, illustrating a condition where a transverse force is applied to the vehicle wheels.

Now, referring to FIG. 10, showing the suspension of FIG. 8 as viewed from the top of the vehicle in the form of a skeleton and omitting the assist link for the purpose of clarity of illustration, when a transverse force is applied to the vehicle wheels 22R and 22L leftward in the figure as shown by the arrows, the suspension would turn first as a whole about the point 12a, and according to this the ball joints 52R and 52L are driven longitudinally in the phases opposite to one another as well as transversely in the same phase in the same manner as described in detail with reference to FIG. 3. The longitudinal forces exerted to the ball joints 52R and 52L would turn the assist link members 66R and 66L about the phantom straight line 72, but are only reacted by the pivot mounting of the assist link members 66R and 66L by the pivot shafts 68R and 68L which allow only the turn about the pivot axes 68RA and 68LA, respectively.

The transverse force applied to the vehicle wheels 22R and 22L also drives the ball joints 52R and 52L transversely in the same direction as the transverse force.

Both of these transverse forces exerted to the ball joints 52R and 52L are, however, only reacted by the assist link, because the ends of the vertical arm portions 66RA and 66LA bearing the ball joints 52R and 52L can not move in the same phase. Thus, the rigidity of the suspension against the transverse force is increased in the same manner as in the preceding embodiments.

Figure 11:
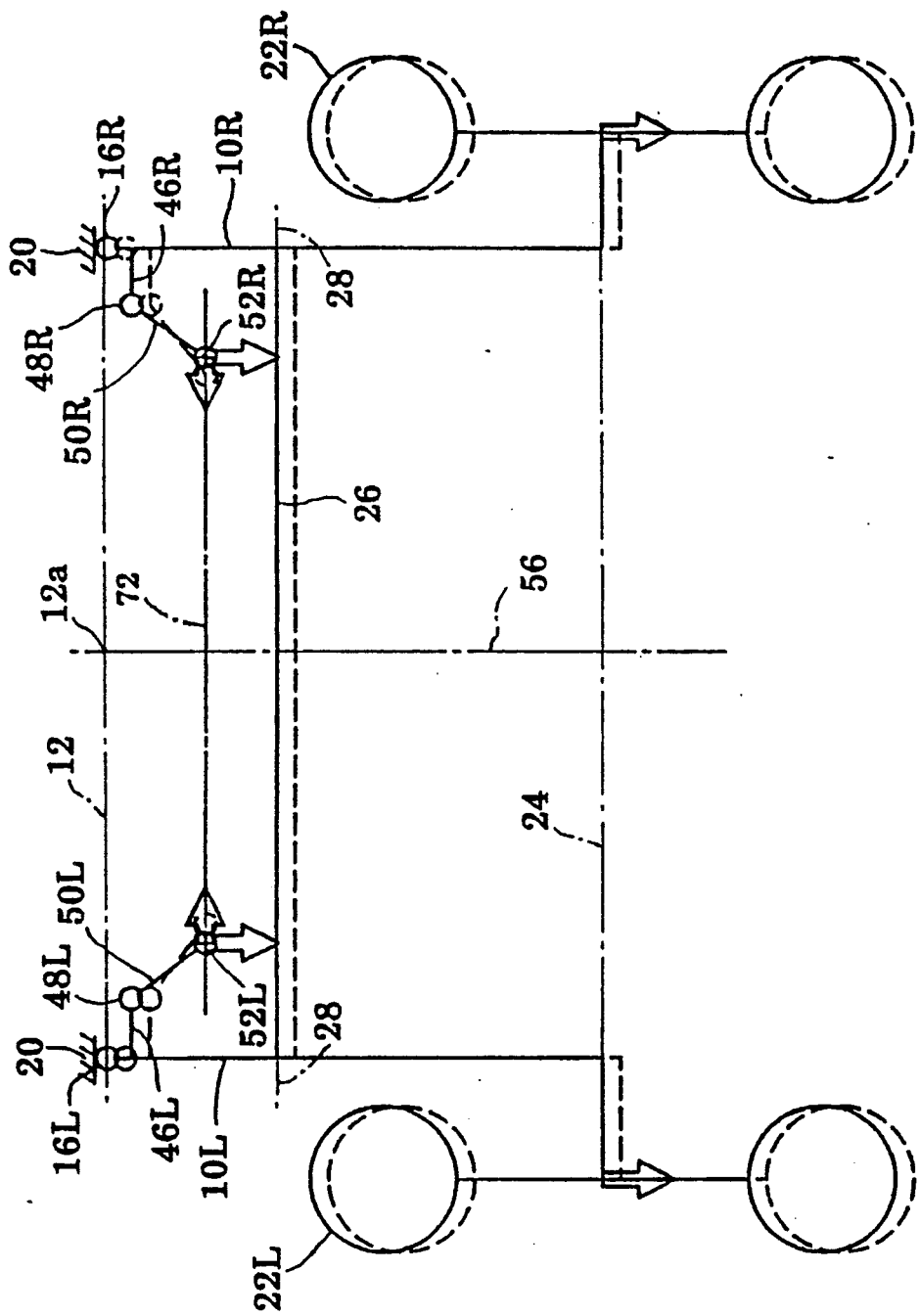
FIG. 11 is the same view as FIG. 10, illustrating a condition where a longitudinal force is applied to the vehicle wheels.

When a longitudinal force is applied to the vehicle wheels as shown in FIG. 11, the ball joints 52R and 52L are driven in the longitudinal direction in the same phase as well as in the transverse direction in the phases opposite to one another. The transverse forces exerted to the transversely opposite ends of the assist link in the phases opposite to one another are easily absorbed by the assist link members 66A and 66B turning about the pivot axes 68RA and 68LA. In this case, therefore, as the trailing arms 10R and 10L are shifted longitudinally by the force applied to the vehicle wheels, ball joints 52R and 52L only shift toward one another, and in fact no substantial forces are exerted in the link system comprising the control links 50R and 50L and the assist link members 66R and 66L, or, in other words, said link system presents no substantial reaction force against the longitudinal shifting of the suspension as a whole.

Also in this embodiment, the phantom straight lines 60R and 60L passing the centers of the ball joints 48R and 48L and the centers of the ball joints 52R and 52L intersect one another at point 62 coinciding with the point at which the axes of rotation 24 of the vehicle wheels 22R and 22L traverses the phantom longitudinal vertical center plane 56, as viewed from the top of the vehicle, and the phantom straight lines 54R and 54L passing the centers of the joints 16R and 16L and the centers of the balls joints 48R and 48L intersect one another at the point 58 positioned on the axis of twisting 28 of the twist beam 26 and coinciding with the point at which the axis of twisting 28 traverses the center plane 56.

Figure 12:
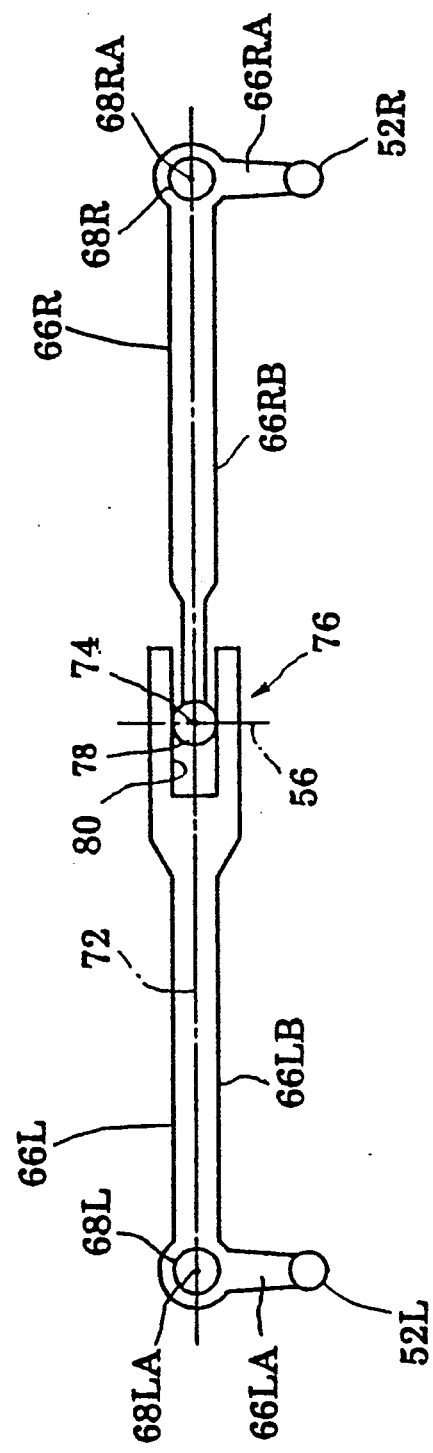
FIG. 12 is a front view of a modification of the assist link shown in FIG. 9, adapted to operate substantially in the same principle as the assist link of FIG. 9.

FIG. 12 shows a modification of the assist link which operates according to the same principle as the assist link shown in FIG. 9. In FIG. 12 the portions corresponding to those shown in FIG. 9 are designated by the same reference numerals and operate substantially in the same manner. In this modification, the sectoral gears 70R and 70L in FIG. 9 are replaced by a slide joint 76 comprising a ball 78 provided at the free end of one of the assist link members such as 66R and a linear groove 80 provided at the free end of the other of the assist link members such as 66L. It will be apparent that this assist link operates substantially in the same manner as the assist link of FIG. 9.

Figure 13:
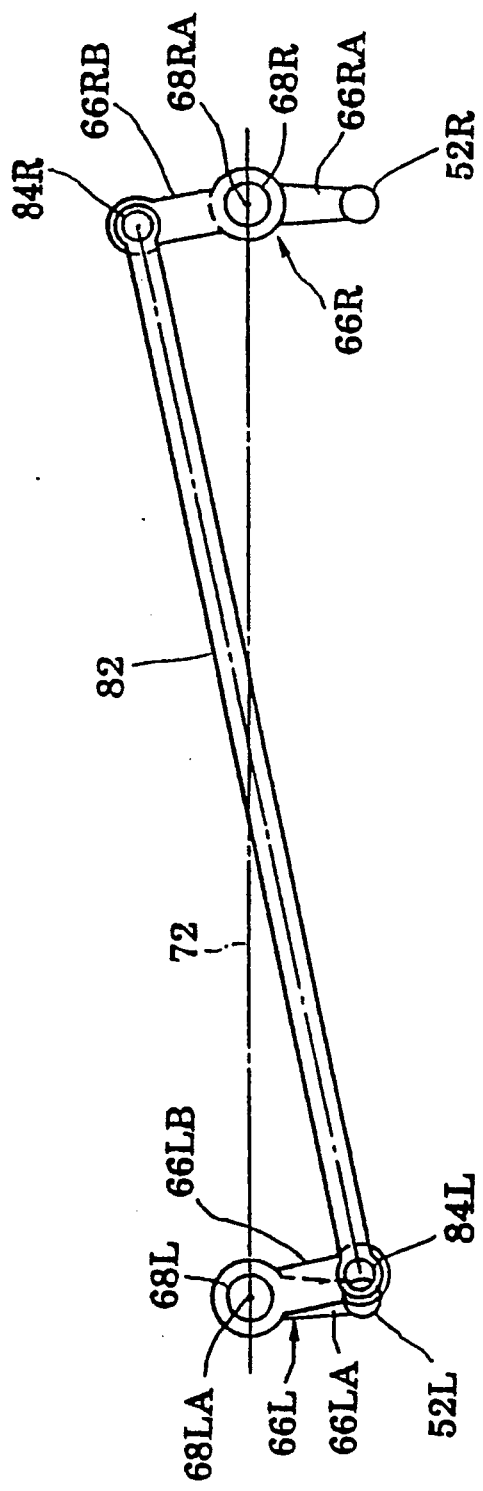
FIG. 13 is another modification of the assist link shown in FIG. 9, adapted to operate substantially in the same principle as the assist link of FIG. 9 but more modified than the assist link in FIG. 12.

FIG. 13 shows another modification of the assist link which operates according to the same principle as the assist link shown in FIG. 9. In FIG. 13 the portions corresponding to those shown in FIG. 9 are designated by the same reference numerals and operate substantially in the same manner. In this modification, the arm portions 66RB and 66LB, though no longer suited for being called "horizontal arm portions", are extended in mutually opposite orientations relative to the vertical arm portions 66RA and 66LA with respect to the pivot axes 68RA and 68LA, and the free ends thereof are directly connected by a joint link member 82 via pivot joints 84R and 84L, respectively. It will also be apparent that this assist link still operates substantially in the same manner as the assist link of FIG. 9.

Figure 14:
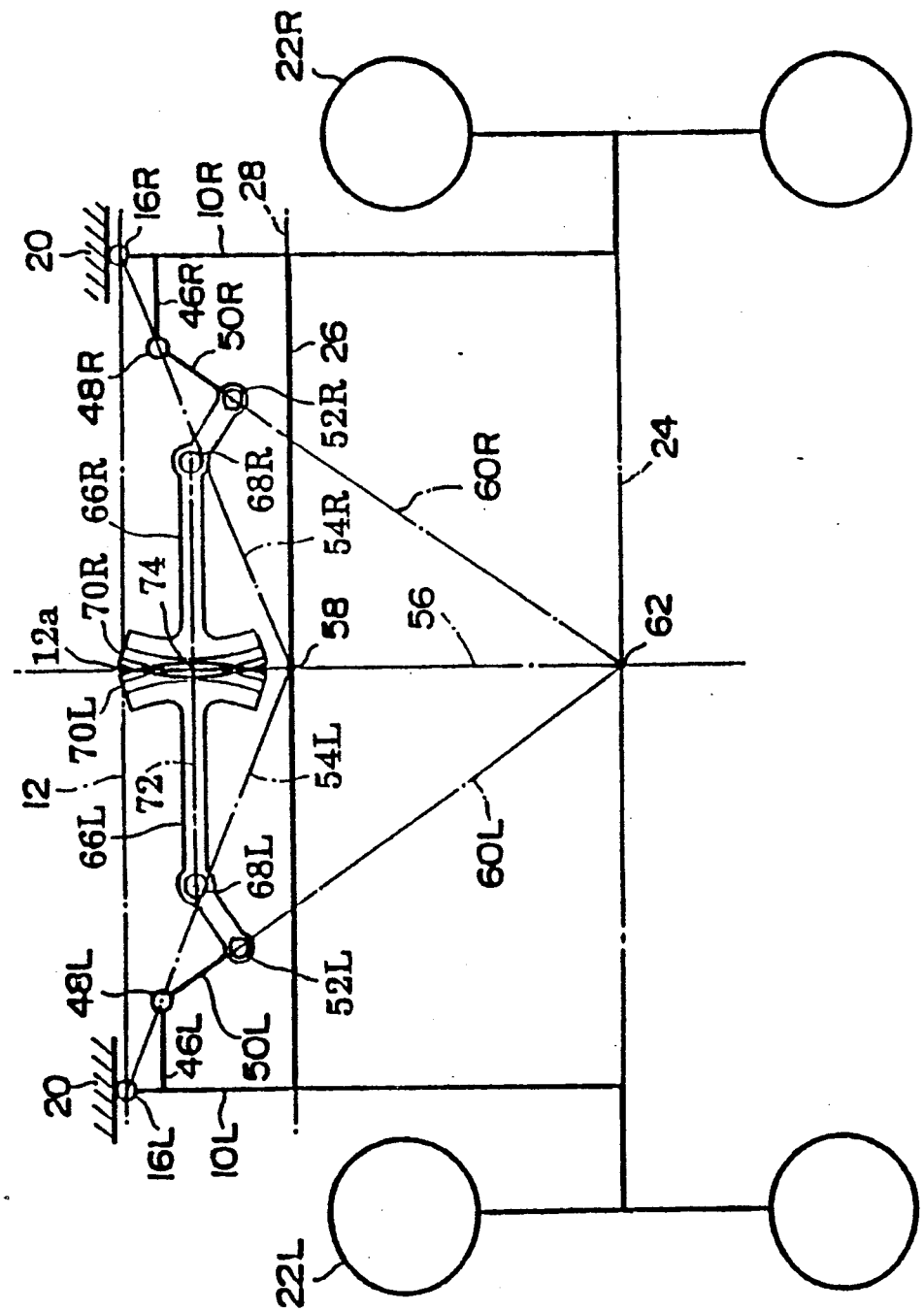
FIG. 14 is a plan view, similar to FIG. 3 or FIG. 10, showing a modification in the mounting of the assist link shown in FIG. 9.

In the assist link in the embodiment shown in FIG. 8, comprising the assist link members 66R and 66L having the vertical arm portions 66RA and 66LA and the horizontal arm portions 66RB and 66LB, respectively, the vertical arm portions 66RA and 66LA are angled downward relative to the horizontal arm portions 66RB and 66LB and the assist link members 66R and 66L are arranged to pivot about the horizontal pivot axes 68RA and 68LA, respectively. However, the combination of the assist link members 66R and 66L may be arranged as turned 90° about a phantom straight line passing the centers of the ball joints 52R and 52L so that the assist link members 66R and 66L pivot about vertical pivot axes 68RA and 66LA. Such a modification is shown in FIG. 14 in the same form of plan view skeleton illustration as FIG. 3 or FIG. 10. In FIG. 14, the portions corresponding to those shown in the preceding figures are designated by the same reference numerals and operate substantially in the same manner. The assist link members 66R and 66L in FIG. 14 are further slightly modified from those in FIG. 8 in that the angles between the arm portions 66RA and 66LA are less angled than a right angle relative to the arm portions 66RB and 66LB for the convenience of design of the assist link.

Figure 15:
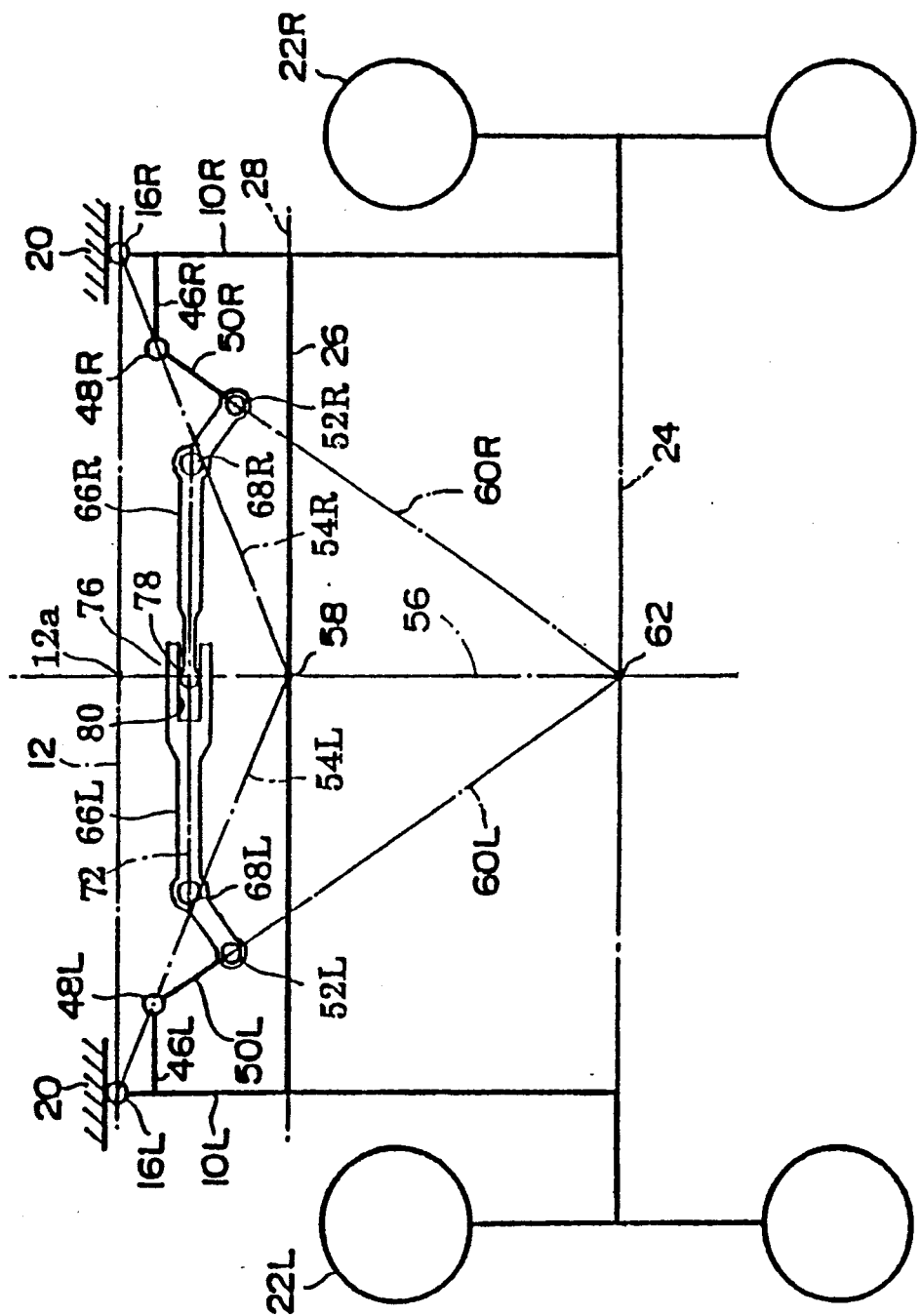
FIG. 15 is a plan view, similar to FIG. 14, showing a modification in the mounting of the assist link shown in FIG. 12.

The assist link of FIG. 12 may also be arranged as turned 90° in the same manner as the assist link in FIG. 8 was modified to the assist link of FIG. 14. Such a modification is shown in FIG. 15 in the same form of plan view skeleton illustration as FIG. 3. Also in FIG. 15, the portions corresponding to those shown in the preceding figures are designated by the same reference numerals and operate substantially in the same manner.

Figure 16:
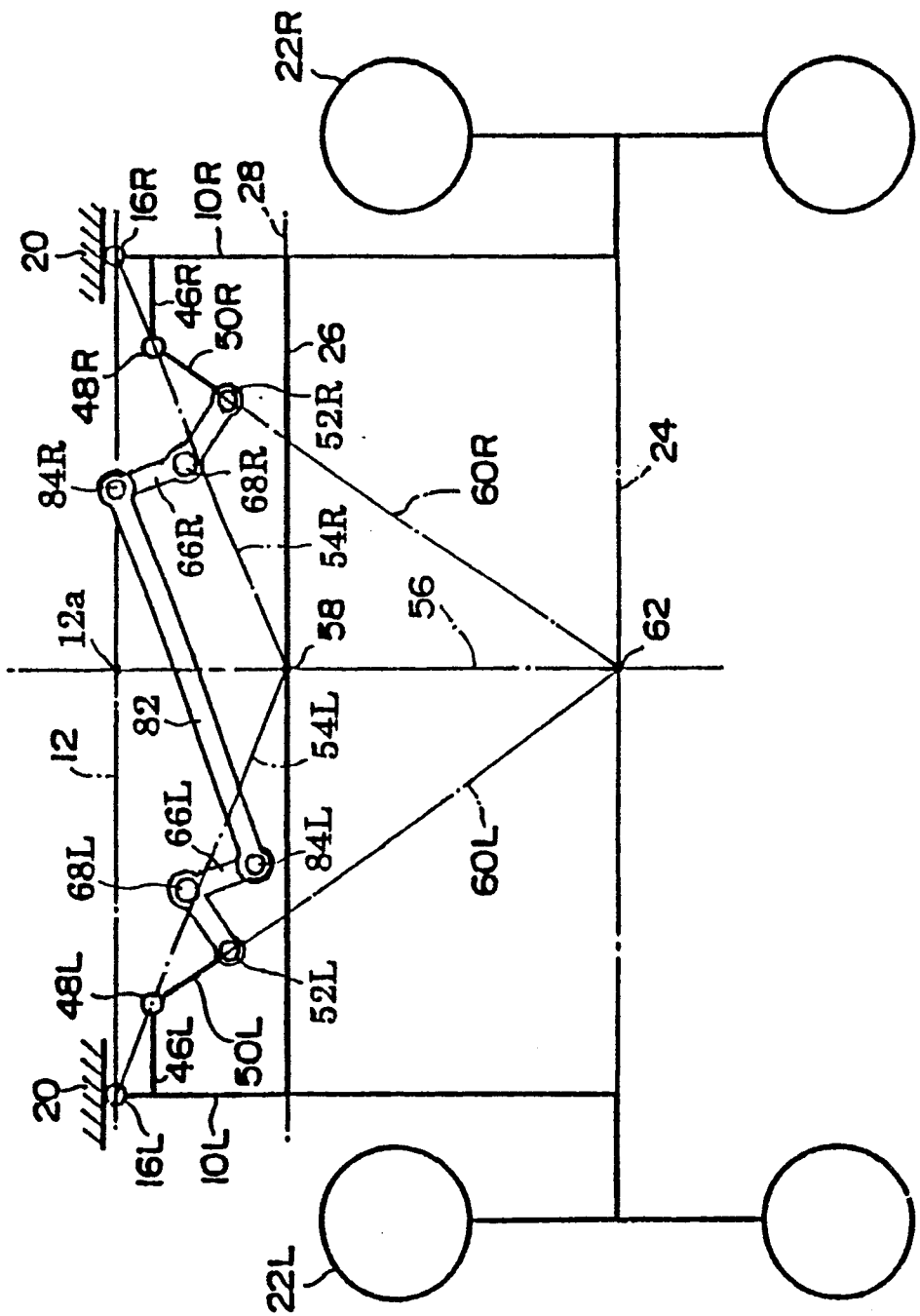
FIG. 16 is a plan view, similar to FIG. 14, showing a modification in the mounting of the assist link shown in FIG. 13.
Figure 17:
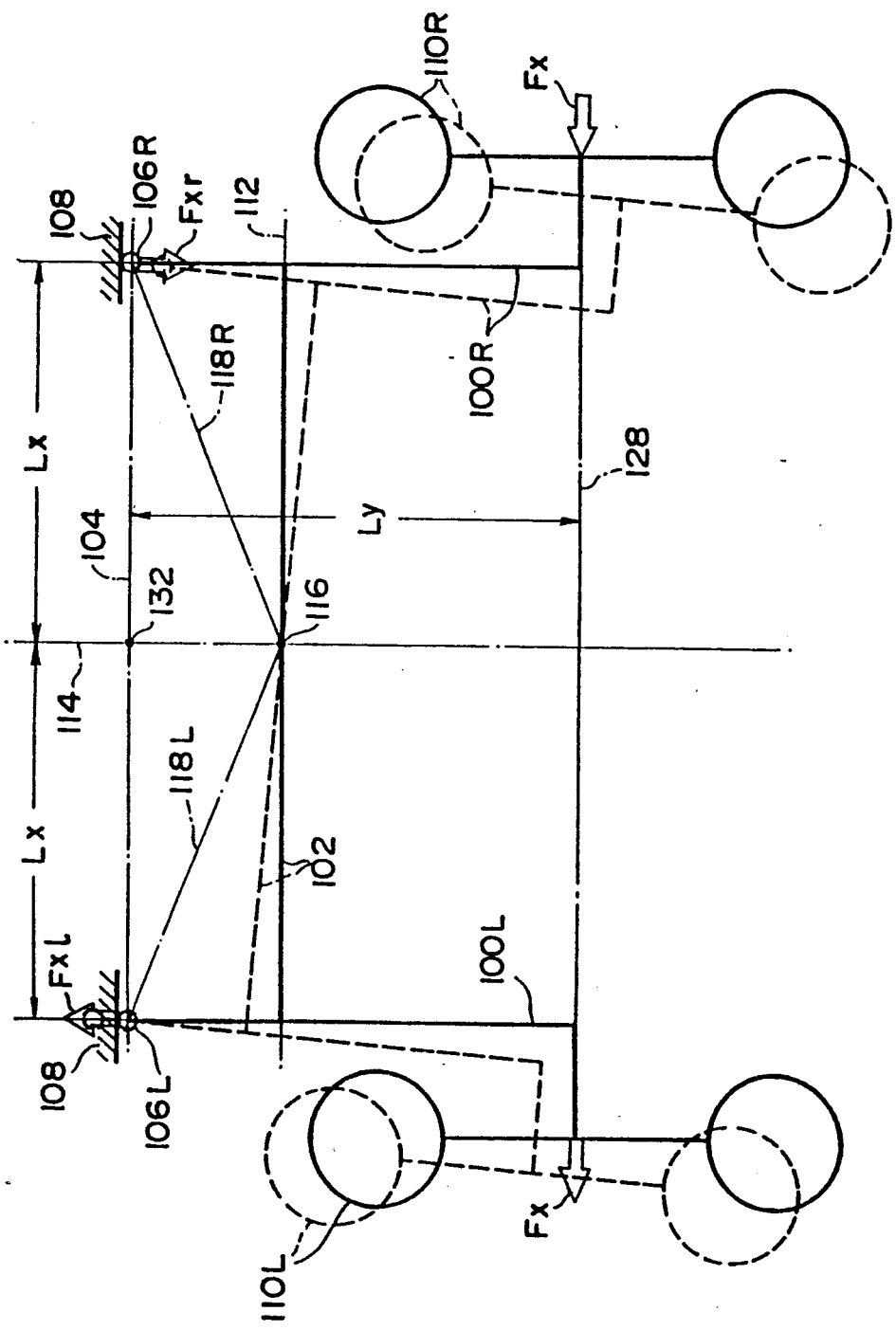
Figure 18:
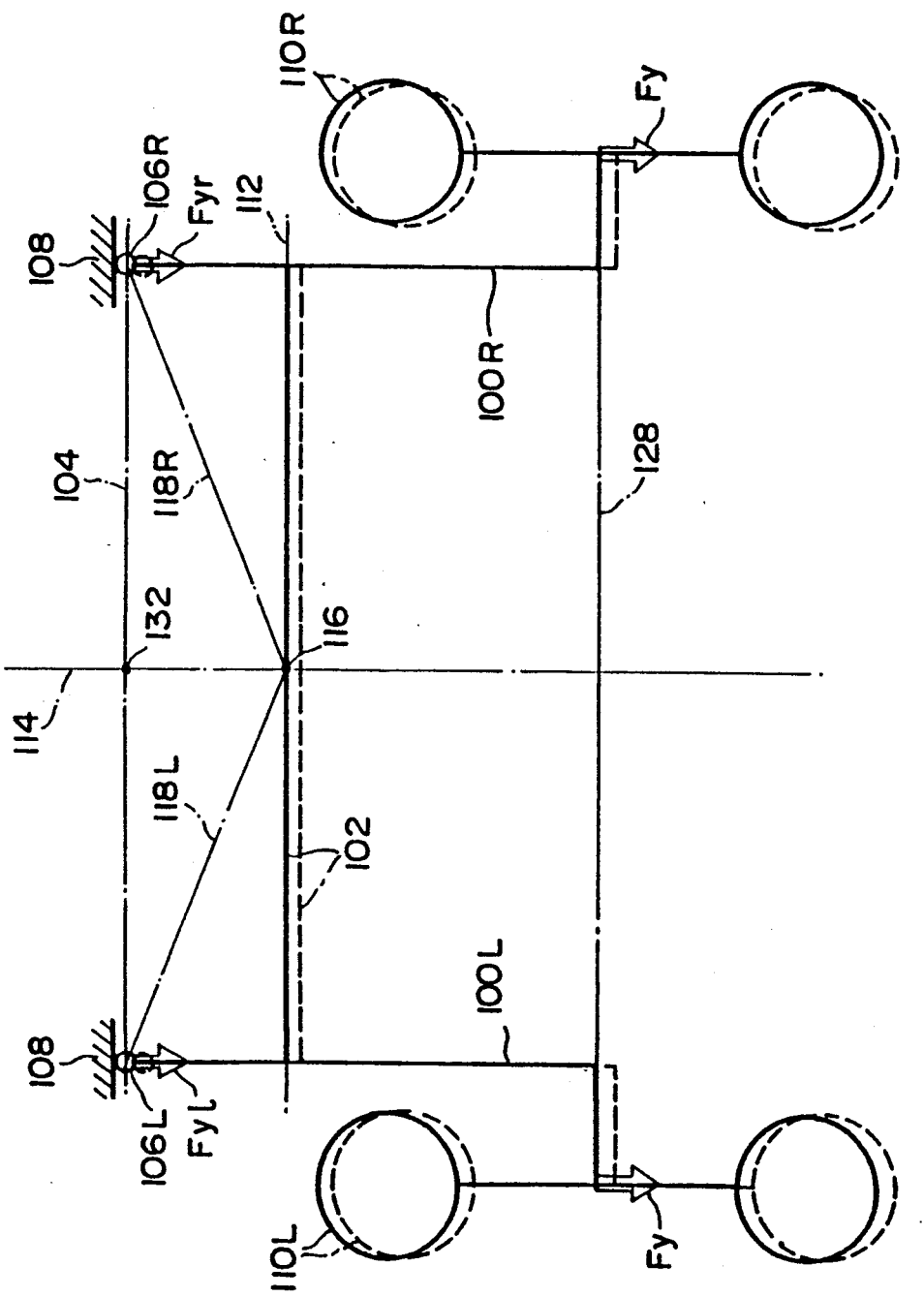
Figure 19:
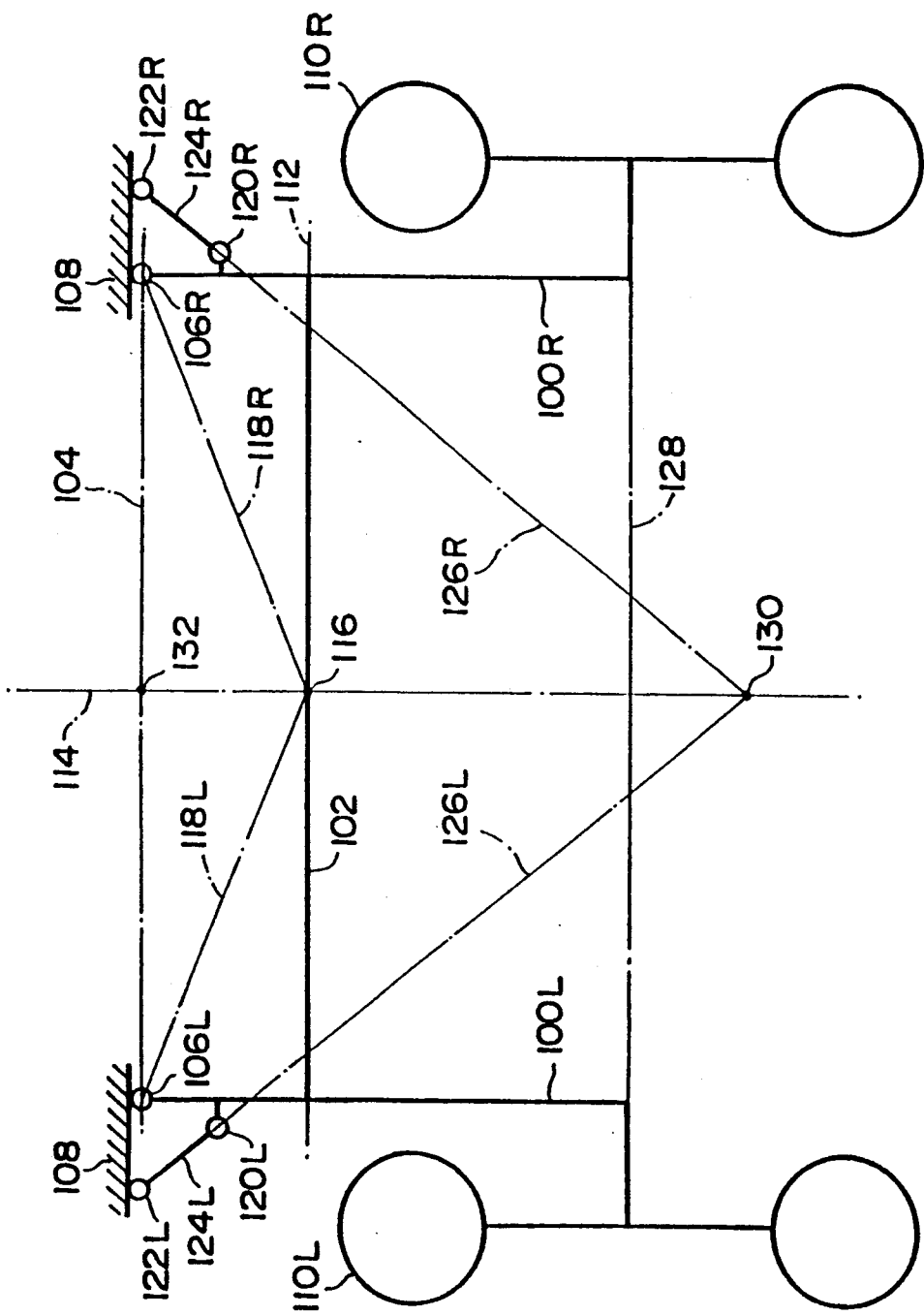
FIG. 19 is a plan view showing the twist beam type rear suspension described in Japanese Utility Model Publication 63-40210 in the form of a skeleton figure.

Further, the assist link of FIG. 13 may also be arranged as turned 90° in the same manner as the assist link in FIG. 8 was modified to the assist link of FIG. 14. Such a modification is shown in FIG. 16 in the same form of plan view skeleton illustration as FIG. 3. Also in FIG. 16, the portions corresponding to those shown in the preceding figures are designated by the same reference numerals and operate substantially in the same manner.

Although the present invention has been described in detail with respect to some preferred embodiments thereof, it will be apparent for those of ordinary skill in the art that various other embodiments are possible without departing from the spirit of the present invention.

I claim:

1. A twist beam type rear suspension comprising a pair of trailing arms disposed to extend along opposite sides of a vehicle as pivotably supported from a vehicle body at front ends thereof and supporting at rear ends thereof rear vehicle wheels to be rotatable about respective axes of rotation thereof extending transversely in the vehicle, a twist beam connected between said pair of trailing arms and twistable about an axis of twisting thereof, an assist link having a central portion disposed substantially transversely in the vehicle as supported from the vehicle body and opposite end portions movable relative to the vehicle body, and a pair of control links each having a first end pivotably connected with each said trailing arm at a portion thereof adjacent said front end thereof and a second end pivotably connected with each said end portion of said assist link, wherein said opposite end portions of said assist link are either movable in the longitudinal direction relative to the vehicle body in the same phase but unmovable in the longitudinal direction relative to the vehicle body in the phases opposite to one another and also unmovable in the transverse direction relative to the vehicle body or movable in the transverse direction relative to the vehicle body in the phases opposite to one another but unmovable in the transverse direction relative to the vehicle body in the same phase, a phantom straight line passing pivot centers of the pivoting connections at said first and second ends of each said control link intersects one another at a point positioned transversely central in the vehicle and longitudinally in a region extending rearward from a point substantially around said axes of rotation of said vehicle wheels as viewed from the top of the vehicle, and a phantom straight line passing a pivot center of the pivoting support of said front end of each said trailing arm and one of said first and second ends of each said control link traverses said axis of twisting.

2. A twist beam type rear suspension according to claim 1, wherein said assist link comprises a rod portion providing said central portion thereof, said rod portion being supported from the vehicle body to be rotatable relative to the vehicle body about its own axis but not movable relative to the vehicle body along its own axis, and a pair of arm portions extending from opposite ends of said rod portion substantially at right angle thereto so as to provide said opposite end portions of said assist link, said arm portions extending substantially vertically in the vehicle.

3. A twist beam type rear suspension according to claim 1, wherein said assist link comprises a pair of assist link members each including a transverse portion providing a half of said central portion thereof and an angled portion integrally connected at one end of said transverse portion as inclined relative to said transverse portion to provide said end portion thereof, each said transverse portion having a sectoral gear at a free end thereof opposite to said one end integrally connected with said angled portion, each said assist link member being supported from the vehicle body at a portion where said transverse portion is joined with said angled portion to be pivotable about a pivoting axis while each said sectoral gear is meshed with one another.

4. A twist beam type rear suspension according to claim 1, wherein said assist link comprises a pair of assist link members each including a transverse portion providing a half of said central portion thereof and an angled portion integrally connected at one end of said transverse portion as inclined relative to said transverse portion to provide said end portion thereof, said transverse portion of one of said assist link members having a ball at a free end thereof opposite to said one end integrally connected with said angled portion, said transverse portion of the other of said assist link members having a groove at a free end thereof opposite to said one end integrally connected with said angled portion for receiving said ball of said one assist link member, each said assist link member being supported from the vehicle body at a portion where said transverse portion is joined with said angled portion to be pivotable about a pivoting axis while each said sectoral gear is meshed with one another.

5. A twist beam type rear suspension according to claim 1, wherein said assist link comprises a first link member having first and second arm portions extending substantially in opposite orientations from a central portion where said first and second arm portions are joined with one another, a second link member having third and fourth arm portions extending substantially in a same orientation from a central portion where said third and fourth arm portions are joined with one another, and a third link member pivotably connected at opposite ends thereof with outer an end of said first arm portion of said first link member remote from said central portion thereof and an outer end of said third arm portion of said second link member remote from said central portion thereof, said first and second link members being pivotably supported from the vehicle body at said central portions thereof, wherein said second arm portion of said first link member and said fourth arm portion of said second link member provide said end portions of said assist link.

6. A twist beam type rear suspension according to claim 3, wherein said pivoting axis of each said assist link member is oriented horizontally and longitudinally in the vehicle.

7. A twist beam type rear suspension according to claim 4, wherein said pivoting axis of each said assist link member is oriented horizontally and longitudinally in the vehicle.

8. A twist beam type rear suspension according to claim 5, wherein said pivoting axis of each said assist link member is oriented horizontally and longitudinally in the vehicle.

9. A twist beam type rear suspension according to claim 3, wherein said pivoting axis of each said assist link member is vertically.

10. A twist beam type rear suspension according to claim 4, wherein said pivoting axis of each said assist link member is vertically.

11. A twist beam type rear suspension according to claim 5, wherein said pivoting axis of each said assist link member is vertically.

12. A twist beam type rear suspension according to claim 5, wherein the phantom straight line passing the pivot center of the pivoting support of said front end of each said trailing arm and one of said first and second ends of each said control link traverses said axis of twisting at a point transversely central in the vehicle.

13. A twist beam type rear suspension according to claim 1, wherein the phantom straight line passing the pivot center of the pivoting support of said front end of each said trailing arm and said first end of each said control link traverses said axis of twisting.

14. A twist beam type rear suspension according to claim 1, wherein the phantom straight line passing the pivot center of the pivoting support of said front end of each said trailing arm and said second end of each said control link traverses said axis of twisting.

15. A twist beam type rear suspension according to claim 13, wherein the pivot center of said second end of each said control link is positioned ahead of said twist beam and the pivot center of said first end of each said control link is positioned ahead of the pivot center of said second end of each said control link, as viewed from the top of the vehicle.

16. A twist beam type rear suspension according to claim 14, wherein the pivot center of said second end of each said control link is positioned ahead of said twist beam and the pivot center of said first end of each said control link is positioned ahead of the pivot center of said second end of each said control link, as viewed from the top of the vehicle.

17. A twist beam type rear suspension according to claim 14, wherein the pivot center of said first end of each said control link is positioned ahead of said twist beam and the pivot center of said second end of each said control link is positioned ahead of the pivot center of said first end of each said control link, as viewed from the top of the vehicle.

18. A twist beam type rear suspension according to claim 13, wherein the pivot center of said first end of each said control link is positioned ahead of said twist beam and the pivot center of said second end of each said control link is positioned ahead of the pivot center of said first end of each said control link, as viewed from the top of the vehicle.

* * * * *